United States Patent
Robbins

(10) Patent No.: US 9,581,820 B2
(45) Date of Patent: Feb. 28, 2017

(54) MULTIPLE WAVEGUIDE IMAGING STRUCTURE

(71) Applicant: Microsoft Technology Licensing, LLC, Redmond, WA (US)

(72) Inventor: Steven John Robbins, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 11 days.

(21) Appl. No.: 14/635,474

(22) Filed: Mar. 2, 2015

(65) Prior Publication Data

US 2015/0168731 A1    Jun. 18, 2015

Related U.S. Application Data

(63) Continuation of application No. 13/488,145, filed on Jun. 4, 2012, now Pat. No. 8,989,535.

(51) Int. Cl.
*G02B 6/42* (2006.01)
*G02B 6/00* (2006.01)
(Continued)

(52) U.S. Cl.
CPC .......... *G02B 27/0172* (2013.01); *G02B 5/30* (2013.01); *G02B 6/4206* (2013.01);
(Continued)

(58) Field of Classification Search
CPC ...... G02B 6/00; G02B 6/0056; G02B 6/2726; G02B 6/30; G02B 6/4206; G02B 27/0172;
(Continued)

(56) References Cited

U.S. PATENT DOCUMENTS 3,836,258 A    9/1974 Courten et al.
3,906,528 A    9/1975 Johnson
(Continued)

FOREIGN PATENT DOCUMENTS

CN    1440513    9/2003
CN    101029968    9/2007
(Continued)

OTHER PUBLICATIONS

"Advisory Action", U.S. Appl. No. 13/428,879, Sep. 19, 2014, 3 pages.
(Continued)

*Primary Examiner* — Akm Enayet Ullah
*Assistant Examiner* — Michael Mooney
(74) *Attorney, Agent, or Firm* — Micah Goldsmith; Judy Yee; Micky Minhas

(57) ABSTRACT

In embodiments of a multiple waveguide imaging structure, a wearable display device includes left and right imaging units of respective display lens systems to generate an augmented reality image that includes a virtual image. Each of the left and right imaging units include a first waveguide for see-through viewing at a first field of view, where the first waveguide includes a first polarizing beam splitter to reflect light that enters at a first polarization orientation angle and pass through the light that enters at a second polarization orientation angle. Each of the left and right imaging units also include at least a second waveguide for see-through viewing at a second field of view, where the second waveguide includes a second polarizing beam splitter to reflect the light that enters at the first polarization orientation angle and pass through the light that enters at the second polarization orientation angle.

20 Claims, 5 Drawing Sheets

(51) Int. Cl.

| | | |
|---|---|---|
| *G02B 6/26* | (2006.01) | |
| *G02F 1/00* | (2006.01) | |
| *G09G 5/00* | (2006.01) | |
| *G03B 21/00* | (2006.01) | |
| *G02B 27/28* | (2006.01) | |
| *G02B 27/01* | (2006.01) | |
| *G02B 5/30* | (2006.01) | |
| *G06T 19/00* | (2011.01) | |
| *F21V 8/00* | (2006.01) | |
| *G02B 6/27* | (2006.01) | |

(52) U.S. Cl.
CPC .......... *G02B 27/283* (2013.01); *G06T 19/006* (2013.01); *G02B 6/00* (2013.01); *G02B 6/0056* (2013.01); *G02B 6/2726* (2013.01); *G02B 2027/0125* (2013.01); *G02B 2027/0178* (2013.01); *Y10S 385/901* (2013.01)

(58) Field of Classification Search
CPC .......... G02B 27/283; G02B 2027/0125; G02B 2027/0178; G02B 5/30; G06T 19/006; Y10S 385/901
USPC . 385/11, 16–21, 27, 31, 39, 47, 50, 51, 129, 385/901; 349/5–12, 15, 18, 96, 117, 349/193–194, 196; 359/320, 489.01, 359/489.06, 489.08, 629–640; 345/7–9; 353/7–8
See application file for complete search history.

(56) References Cited

U.S. PATENT DOCUMENTS

| | | |
|---|---|---|
| 3,971,065 A | 7/1976 | Bayer |
| 4,711,512 A | 12/1987 | Upatnieks |
| 4,822,145 A | 4/1989 | Staelin |
| 4,860,361 A | 8/1989 | Sato et al. |
| 4,957,351 A | 9/1990 | Shioji |
| 5,019,808 A | 5/1991 | Prince et al. |
| 5,146,355 A | 9/1992 | Prince et al. |
| 5,252,950 A | 10/1993 | Saunders et al. |
| 5,309,169 A | 5/1994 | Leppert |
| 5,359,444 A | 10/1994 | Piosenka et al. |
| 5,453,877 A | 9/1995 | Gerbe et al. |
| 5,455,458 A | 10/1995 | Quon et al. |
| 5,455,882 A | 10/1995 | Veligdan |
| 5,459,611 A | 10/1995 | Bohn et al. |
| 5,483,307 A | 1/1996 | Anderson |
| 5,543,588 A | 8/1996 | Bisset et al. |
| 5,574,473 A | 11/1996 | Sekiguchi |
| 5,579,830 A | 12/1996 | Giammaruti |
| 5,583,609 A | 12/1996 | Mizutani et al. |
| 5,606,455 A | 2/1997 | Eichenlaub |
| 5,614,941 A | 3/1997 | Hines |
| 5,648,643 A | 7/1997 | Knowles et al. |
| 5,651,414 A | 7/1997 | Suzuki et al. |
| 5,673,146 A | 9/1997 | Kelly |
| 5,708,449 A | 1/1998 | Heacock et al. |
| 5,714,967 A | 2/1998 | Okamura et al. |
| 5,737,171 A | 4/1998 | Buller et al. |
| 5,751,476 A | 5/1998 | Matsui et al. |
| 5,771,320 A | 6/1998 | Stone |
| 5,856,842 A | 1/1999 | Tedesco |
| 5,861,931 A | 1/1999 | Gillian et al. |
| 5,886,822 A | 3/1999 | Spitzer |
| 5,940,149 A | 8/1999 | Vanderwerf |
| 5,959,664 A | 9/1999 | Woodgate |
| 5,982,553 A | 11/1999 | Bloom et al. |
| 5,991,087 A | 11/1999 | Rallison |
| 6,101,008 A | 8/2000 | Popovich |
| 6,144,439 A | 11/2000 | Carollo |
| 6,160,667 A | 12/2000 | Smoot |
| 6,188,427 B1 | 2/2001 | Anderson et al. |
| 6,226,178 B1 | 5/2001 | Broder et al. |
| 6,239,502 B1 | 5/2001 | Grewe et al. |
| 6,271,808 B1 | 8/2001 | Corbin |
| 6,307,142 B1 | 10/2001 | Allen et al. |
| 6,323,970 B1 | 11/2001 | Popovich |
| 6,377,401 B1 | 4/2002 | Bartlett |
| 6,411,512 B1 | 6/2002 | Mankaruse et al. |
| 6,446,442 B1 | 9/2002 | Batchelor et al. |
| 6,466,198 B1 | 10/2002 | Feinstein |
| 6,470,289 B1 | 10/2002 | Peters et al. |
| 6,481,851 B1 | 11/2002 | McNelley et al. |
| 6,496,218 B2 | 12/2002 | Takigawa et al. |
| 6,529,331 B2 | 3/2003 | Massof et al. |
| 6,542,307 B2 | 4/2003 | Gleckman et al. |
| 6,545,650 B1 | 4/2003 | Yamada et al. |
| 6,547,416 B2 | 4/2003 | Pashley et al. |
| 6,554,428 B2 | 4/2003 | Fergason et al. |
| 6,577,411 B1 | 6/2003 | David |
| 6,580,529 B1 | 6/2003 | Amitai et al. |
| 6,606,152 B2 | 8/2003 | Littau |
| 6,621,702 B2 | 9/2003 | Elias et al. |
| 6,631,755 B1 | 10/2003 | Kung et al. |
| 6,635,999 B2 | 10/2003 | Belliveau |
| 6,639,201 B2 | 10/2003 | Almogy et al. |
| 6,735,499 B2 | 5/2004 | Ohki et al. |
| 6,753,828 B2 | 6/2004 | Tuceryan et al. |
| 6,775,460 B2 | 8/2004 | Steiner et al. |
| 6,804,115 B2 | 10/2004 | Lai |
| 6,809,925 B2 | 10/2004 | Belady et al. |
| 6,825,987 B2 | 11/2004 | Repetto et al. |
| 6,829,095 B2 | 12/2004 | Amitai |
| 6,867,753 B2 | 3/2005 | Chinthammit et al. |
| 6,888,613 B2 | 5/2005 | Robins et al. |
| 6,889,755 B2 | 5/2005 | Zuo et al. |
| 6,906,901 B1 | 6/2005 | Liu |
| 6,919,867 B2 | 7/2005 | Sauer |
| 6,947,020 B2 | 9/2005 | Kiser et al. |
| 6,964,731 B1 | 11/2005 | Krisko et al. |
| 6,971,443 B2 | 12/2005 | Kung et al. |
| 6,992,738 B2 | 1/2006 | Ishihara et al. |
| 6,997,241 B2 | 2/2006 | Chou et al. |
| 7,006,215 B2 | 2/2006 | Hoff et al. |
| 7,015,876 B1 | 3/2006 | Miller |
| 7,048,385 B2 | 5/2006 | Beeson et al. |
| 7,069,975 B1 | 7/2006 | Haws et al. |
| 7,113,605 B2 | 9/2006 | Rui et al. |
| 7,116,555 B2 | 10/2006 | Kamath et al. |
| 7,184,615 B2 | 2/2007 | Levola |
| 7,191,820 B2 | 3/2007 | Chou et al. |
| 7,193,584 B2 | 3/2007 | Lee et al. |
| 7,250,930 B2 | 7/2007 | Hoffman et al. |
| 7,261,453 B2 | 8/2007 | Morejon et al. |
| 7,271,795 B2 | 9/2007 | Bradski |
| 7,277,282 B2 | 10/2007 | Tate |
| 7,301,587 B2 | 11/2007 | Uehara et al. |
| 7,337,018 B2 | 2/2008 | Espinoza-Ibarra et al. |
| 7,359,420 B2 | 4/2008 | Shchegrov et al. |
| 7,365,734 B2 | 4/2008 | Fateh et al. |
| 7,369,101 B2 | 5/2008 | Sauer et al. |
| 7,376,852 B2 | 5/2008 | Edwards |
| 7,396,133 B2 | 7/2008 | Burnett et al. |
| 7,412,306 B2 | 8/2008 | Katoh et al. |
| 7,416,017 B2 | 8/2008 | Haws et al. |
| 7,417,617 B2 | 8/2008 | Eichenlaub |
| 7,418,170 B2 | 8/2008 | Mukawa et al. |
| 7,428,001 B2 | 9/2008 | Schowengerdt et al. |
| 7,430,349 B2 | 9/2008 | Jones |
| 7,430,355 B2 | 9/2008 | Heikenfeld et al. |
| 7,455,102 B2 | 11/2008 | Cheng |
| 7,505,269 B1 | 3/2009 | Cosley et al. |
| 7,513,627 B2 | 4/2009 | Larson et al. |
| 7,515,143 B2 | 4/2009 | Keam et al. |
| 7,542,665 B2 | 6/2009 | Lei |
| 7,551,814 B1 | 6/2009 | Smits |
| 7,576,916 B2 | 8/2009 | Amitai |
| 7,583,327 B2 | 9/2009 | Takatani |
| 7,607,111 B2 | 10/2009 | Vaananen et al. |
| 7,619,895 B1 | 11/2009 | Wertz et al. |
| 7,631,687 B2 | 12/2009 | Yang |
| 7,646,606 B2 | 1/2010 | Rytka et al. |

(56) References Cited

U.S. PATENT DOCUMENTS

| | | | |
|---|---|---|---|
| 7,649,594 B2 | 1/2010 | Kim et al. |
| 7,660,500 B2 | 2/2010 | Konttinen et al. |
| 7,679,641 B2 | 3/2010 | Lipton et al. |
| 7,693,292 B1 | 4/2010 | Gross et al. |
| 7,701,716 B2 | 4/2010 | Blanco, Jr. et al. |
| 7,719,769 B2 | 5/2010 | Sugihara et al. |
| 7,768,534 B2 | 8/2010 | Pentenrieder et al. |
| 7,777,944 B2 | 8/2010 | Ho et al. |
| 7,817,104 B2 | 10/2010 | Ryu et al. |
| 7,832,885 B2 | 11/2010 | Hsiao et al. |
| 7,843,691 B2 | 11/2010 | Reichert et al. |
| 7,868,300 B2 | 1/2011 | Kruit et al. |
| 7,894,613 B1 | 2/2011 | Ong et al. |
| 7,903,409 B2 | 3/2011 | Patel et al. |
| 7,909,958 B2 | 3/2011 | Washburn et al. |
| 7,941,231 B1 | 5/2011 | Dunn |
| 7,986,462 B2 | 7/2011 | Kobayashi et al. |
| 8,004,621 B2 | 8/2011 | Woodgate et al. |
| 8,033,709 B2 | 10/2011 | Kao et al. |
| 8,046,616 B2 | 10/2011 | Edwards |
| 8,061,411 B2 | 11/2011 | Xu et al. |
| 8,085,948 B2 | 12/2011 | Thomas et al. |
| 8,092,064 B2 | 1/2012 | Erchak et al. |
| 8,125,579 B2 | 2/2012 | Khan et al. |
| 8,160,411 B2 | 4/2012 | Levola et al. |
| 8,195,220 B2 | 6/2012 | Kim et al. |
| 8,233,204 B1 | 7/2012 | Robbins et al. |
| 8,233,273 B2 | 7/2012 | Chen et al. |
| 8,246,170 B2 | 8/2012 | Yamamoto et al. |
| 8,274,614 B2 | 9/2012 | Yokote et al. |
| 8,384,999 B1 | 2/2013 | Crosby et al. |
| 8,392,035 B2 | 3/2013 | Patel et al. |
| 8,395,898 B1 | 3/2013 | Chamseddine et al. |
| 8,418,083 B1 | 4/2013 | Lundy et al. |
| 8,446,340 B2 | 5/2013 | Aharoni |
| 8,472,119 B1 | 6/2013 | Kelly |
| 8,482,920 B2 | 7/2013 | Tissot et al. |
| 8,576,143 B1 | 11/2013 | Kelly |
| 8,611,014 B2 | 12/2013 | Valera et al. |
| 8,629,815 B2 | 1/2014 | Brin et al. |
| 8,638,498 B2 | 1/2014 | Bohn et al. |
| 8,645,871 B2 | 2/2014 | Fong et al. |
| 8,666,212 B1 | 3/2014 | Amirparviz |
| 8,712,598 B2 | 4/2014 | Dighde et al. |
| 8,754,831 B2 | 6/2014 | Kollin et al. |
| 8,770,813 B2 | 7/2014 | Bohn et al. |
| 8,810,600 B2 | 8/2014 | Bohn et al. |
| 8,817,350 B1 | 8/2014 | Robbins et al. |
| 8,823,531 B1 | 9/2014 | McCleary et al. |
| 8,854,802 B2 | 10/2014 | Robinson et al. |
| 8,909,384 B1 | 12/2014 | Beitelmal et al. |
| 8,917,453 B2 | 12/2014 | Bohn |
| 8,934,235 B2 | 1/2015 | Rubenstein et al. |
| 8,941,683 B2 | 1/2015 | Son et al. |
| 8,989,535 B2 | 3/2015 | Robbins |
| 9,052,414 B2 | 6/2015 | Travis et al. |
| 9,223,138 B2 | 12/2015 | Bohn |
| 9,272,338 B2 * | 3/2016 | Fujita ............... B23B 41/00 |
| 9,297,996 B2 | 3/2016 | Bohn et al. |
| 9,298,012 B2 | 3/2016 | Bohn et al. |
| 9,368,546 B2 | 6/2016 | Fleck et al. |
| 2001/0043208 A1 | 11/2001 | Furness, III et al. |
| 2002/0041735 A1 | 4/2002 | Cai et al. |
| 2002/0044152 A1 | 4/2002 | Abbott et al. |
| 2002/0044162 A1 | 4/2002 | Sawatari |
| 2002/0063820 A1 | 5/2002 | Broer et al. |
| 2002/0097558 A1 | 7/2002 | Stone et al. |
| 2002/0171939 A1 | 11/2002 | Song |
| 2002/0180659 A1 | 12/2002 | Takahashi |
| 2003/0006364 A1 | 1/2003 | Katzir et al. |
| 2003/0023889 A1 | 1/2003 | Hofstee et al. |
| 2003/0137706 A1 | 7/2003 | Rmanujam et al. |
| 2003/0179453 A1 | 9/2003 | Mori et al. |
| 2004/0011503 A1 | 1/2004 | Kung et al. |
| 2004/0085649 A1 | 5/2004 | Repetto et al. |
| 2004/0108971 A1 | 6/2004 | Waldern et al. |
| 2004/0109234 A1 | 6/2004 | Levola |
| 2004/0135209 A1 | 7/2004 | Hsieh et al. |
| 2004/0195963 A1 | 10/2004 | Choi et al. |
| 2004/0267990 A1 | 12/2004 | Lin |
| 2005/0174737 A1 | 8/2005 | Meir |
| 2005/0179372 A1 | 8/2005 | Kawakami et al. |
| 2005/0207120 A1 | 9/2005 | Tseng et al. |
| 2005/0225233 A1 | 10/2005 | Boroson et al. |
| 2005/0243107 A1 | 11/2005 | Haim et al. |
| 2005/0248705 A1 | 11/2005 | Smith et al. |
| 2005/0285878 A1 | 12/2005 | Singh et al. |
| 2006/0018025 A1 | 1/2006 | Sharon et al. |
| 2006/0032616 A1 | 2/2006 | Yang |
| 2006/0038881 A1 | 2/2006 | Starkweather et al. |
| 2006/0044399 A1 | 3/2006 | Fredlund et al. |
| 2006/0054787 A1 | 3/2006 | Olsen et al. |
| 2006/0072206 A1 | 4/2006 | Tsuyuki et al. |
| 2006/0118280 A1 | 6/2006 | Liu |
| 2006/0129951 A1 | 6/2006 | Vaananen et al. |
| 2006/0132914 A1 | 6/2006 | Weiss et al. |
| 2006/0139447 A1 | 6/2006 | Unkrich |
| 2006/0152646 A1 | 7/2006 | Schrader |
| 2006/0164382 A1 | 7/2006 | Kulas et al. |
| 2006/0196643 A1 | 9/2006 | Hata et al. |
| 2006/0221448 A1 | 10/2006 | Nivon et al. |
| 2006/0228073 A1 | 10/2006 | Mukawa et al. |
| 2006/0249765 A1 | 11/2006 | Hsieh |
| 2007/0002412 A1 | 1/2007 | Aihara |
| 2007/0008456 A1 | 1/2007 | Lesage et al. |
| 2007/0023703 A1 | 2/2007 | Sunaoshi et al. |
| 2007/0027591 A1 | 2/2007 | Goldenberg et al. |
| 2007/0041684 A1 | 2/2007 | Popovich et al. |
| 2007/0097019 A1 | 5/2007 | Wynne-Powell et al. |
| 2007/0147673 A1 | 6/2007 | Crandall |
| 2007/0153395 A1 | 7/2007 | Repetto et al. |
| 2007/0177260 A1 | 8/2007 | Kuppenheimer et al. |
| 2007/0236959 A1 | 10/2007 | Tolbert |
| 2007/0284093 A1 | 12/2007 | Bhatti et al. |
| 2008/0007511 A1 | 1/2008 | Tsuboi et al. |
| 2008/0043100 A1 | 2/2008 | Sobel et al. |
| 2008/0043425 A1 | 2/2008 | Hebert et al. |
| 2008/0088603 A1 | 4/2008 | Eliasson et al. |
| 2008/0088624 A1 | 4/2008 | Long et al. |
| 2008/0106677 A1 | 5/2008 | Kuan et al. |
| 2008/0117341 A1 | 5/2008 | McGrew |
| 2008/0141681 A1 | 6/2008 | Arnold |
| 2008/0150913 A1 | 6/2008 | Bell et al. |
| 2008/0174735 A1 | 7/2008 | Quach et al. |
| 2008/0232680 A1 | 9/2008 | Berestov et al. |
| 2008/0248852 A1 | 10/2008 | Rasmussen |
| 2008/0280682 A1 | 11/2008 | Brunner et al. |
| 2008/0285140 A1 | 11/2008 | Amitai |
| 2008/0297535 A1 | 12/2008 | Reinig |
| 2008/0303918 A1 | 12/2008 | Keithley |
| 2008/0311386 A1 | 12/2008 | Wendt |
| 2009/0002939 A1 | 1/2009 | Baugh et al. |
| 2009/0015742 A1 | 1/2009 | Liao et al. |
| 2009/0021908 A1 | 1/2009 | Patel et al. |
| 2009/0051283 A1 | 2/2009 | Cok et al. |
| 2009/0084525 A1 | 4/2009 | Satou et al. |
| 2009/0092261 A1 | 4/2009 | Bard |
| 2009/0097127 A1 | 4/2009 | Amitai |
| 2009/0128449 A1 | 5/2009 | Brown et al. |
| 2009/0128901 A1 | 5/2009 | Tilleman et al. |
| 2009/0180250 A1 | 7/2009 | Holling et al. |
| 2009/0189974 A1 | 7/2009 | Deering |
| 2009/0190003 A1 | 7/2009 | Park et al. |
| 2009/0195756 A1 | 8/2009 | Li et al. |
| 2009/0222147 A1 | 9/2009 | Nakashima et al. |
| 2009/0244413 A1 | 10/2009 | Ishikawa et al. |
| 2009/0246707 A1 | 10/2009 | Li et al. |
| 2009/0256837 A1 | 10/2009 | Deb et al. |
| 2009/0262419 A1 | 10/2009 | Robinson et al. |
| 2010/0002989 A1 | 1/2010 | Tokushima |
| 2010/0021108 A1 | 1/2010 | Kang et al. |
| 2010/0053151 A1 | 3/2010 | Marti et al. |
| 2010/0060551 A1 | 3/2010 | Sugiyama et al. |
| 2010/0061078 A1 | 3/2010 | Kim |

(56) References Cited

U.S. PATENT DOCUMENTS

| | | |
|---|---|---|
| 2010/0084674 A1 | 4/2010 | Paetzold et al. |
| 2010/0096617 A1 | 4/2010 | Shanks |
| 2010/0103078 A1 | 4/2010 | Mukawa et al. |
| 2010/0134534 A1 | 6/2010 | Sesselberg et al. |
| 2010/0141905 A1 | 6/2010 | Burke |
| 2010/0149073 A1 | 6/2010 | Chaum et al. |
| 2010/0188353 A1 | 7/2010 | Yoon et al. |
| 2010/0200736 A1 | 8/2010 | Laycock et al. |
| 2010/0201953 A1 | 8/2010 | Freeman et al. |
| 2010/0213467 A1 | 8/2010 | Lee et al. |
| 2010/0220439 A1 | 9/2010 | Qin |
| 2010/0229853 A1 | 9/2010 | Vandal et al. |
| 2010/0238270 A1 | 9/2010 | Bjelkhagen et al. |
| 2010/0238664 A1 | 9/2010 | Steenbergen et al. |
| 2010/0245387 A1 | 9/2010 | Bachelder et al. |
| 2010/0259889 A1 | 10/2010 | Chen et al. |
| 2010/0271467 A1 | 10/2010 | Akeley |
| 2010/0277421 A1 | 11/2010 | Charlier et al. |
| 2010/0277439 A1 | 11/2010 | Charlier et al. |
| 2010/0277779 A1 | 11/2010 | Futterer et al. |
| 2010/0281439 A1 | 11/2010 | Markovic et al. |
| 2010/0300654 A1 | 12/2010 | Edwards |
| 2010/0309687 A1 | 12/2010 | Sampsell et al. |
| 2010/0315781 A1 | 12/2010 | Agostini |
| 2010/0317132 A1 | 12/2010 | Rogers et al. |
| 2010/0321609 A1 | 12/2010 | Qi et al. |
| 2010/0328351 A1 | 12/2010 | Tan |
| 2011/0012814 A1 | 1/2011 | Tanaka |
| 2011/0021251 A1 | 1/2011 | Lindén |
| 2011/0025605 A1 | 2/2011 | Kwitek |
| 2011/0032482 A1 | 2/2011 | Agurok |
| 2011/0050547 A1 | 3/2011 | Mukawa |
| 2011/0050655 A1 | 3/2011 | Mukawa |
| 2011/0051660 A1 | 3/2011 | Arora et al. |
| 2011/0063795 A1 | 3/2011 | Yeh et al. |
| 2011/0068699 A1 | 3/2011 | Knapp |
| 2011/0075442 A1 | 3/2011 | Chiang |
| 2011/0084893 A1 | 4/2011 | Lee et al. |
| 2011/0090343 A1 | 4/2011 | Alt et al. |
| 2011/0091156 A1 | 4/2011 | Laughlin |
| 2011/0114823 A1 | 5/2011 | Katzir et al. |
| 2011/0127024 A1 | 6/2011 | Patel et al. |
| 2011/0134017 A1 | 6/2011 | Burke |
| 2011/0134645 A1 | 6/2011 | Hitchcock et al. |
| 2011/0141388 A1 | 6/2011 | Park et al. |
| 2011/0148931 A1 | 6/2011 | Kim |
| 2011/0163986 A1 | 7/2011 | Lee et al. |
| 2011/0194029 A1 | 8/2011 | Herrmann et al. |
| 2011/0205251 A1 | 8/2011 | Auld |
| 2011/0210946 A1 | 9/2011 | Goertz et al. |
| 2011/0214082 A1 | 9/2011 | Osterhout et al. |
| 2011/0215349 A1 | 9/2011 | An et al. |
| 2011/0221658 A1 | 9/2011 | Haddick et al. |
| 2011/0221659 A1 | 9/2011 | King et al. |
| 2011/0222236 A1 | 9/2011 | Luo et al. |
| 2011/0227820 A1 | 9/2011 | Haddick et al. |
| 2011/0227913 A1 | 9/2011 | Hyndman |
| 2011/0242145 A1 | 10/2011 | Nishimura et al. |
| 2011/0242392 A1 | 10/2011 | Chiang |
| 2011/0242757 A1 | 10/2011 | Tracy et al. |
| 2011/0248904 A1 | 10/2011 | Miyawaki et al. |
| 2011/0248958 A1 | 10/2011 | Gruhlke et al. |
| 2011/0267799 A1 | 11/2011 | Epstein et al. |
| 2011/0283223 A1 | 11/2011 | Vaittinen et al. |
| 2011/0299044 A1 | 12/2011 | Yeh et al. |
| 2011/0304640 A1 | 12/2011 | Noge |
| 2011/0309378 A1 | 12/2011 | Lau et al. |
| 2011/0310232 A1 | 12/2011 | Wilson et al. |
| 2011/0310312 A1 | 12/2011 | Yokote et al. |
| 2012/0013651 A1 | 1/2012 | Trayner et al. |
| 2012/0019434 A1 | 1/2012 | Kuhlman et al. |
| 2012/0026161 A1 | 2/2012 | Chen et al. |
| 2012/0033306 A1 | 2/2012 | Valera et al. |
| 2012/0038629 A1 | 2/2012 | Brown et al. |
| 2012/0041721 A1 | 2/2012 | Chen |
| 2012/0050144 A1 | 3/2012 | Morlock et al. |
| 2012/0052934 A1 | 3/2012 | Maharbiz et al. |
| 2012/0062998 A1 | 3/2012 | Schultz et al. |
| 2012/0069413 A1 | 3/2012 | Schultz |
| 2012/0083325 A1 | 4/2012 | Heatherly |
| 2012/0102438 A1 | 4/2012 | Robinson et al. |
| 2012/0105487 A1 | 5/2012 | Son et al. |
| 2012/0106170 A1 | 5/2012 | Matthews et al. |
| 2012/0111544 A1 | 5/2012 | Senatori |
| 2012/0113092 A1 | 5/2012 | Bar-Zeev et al. |
| 2012/0127577 A1 | 5/2012 | Desserouer |
| 2012/0157114 A1 | 6/2012 | Alameh et al. |
| 2012/0162764 A1 | 6/2012 | Shimizu |
| 2012/0176474 A1 | 7/2012 | Border |
| 2012/0182687 A1 | 7/2012 | Dighde et al. |
| 2012/0188205 A1 | 7/2012 | Jansson et al. |
| 2012/0200495 A1 | 8/2012 | Johansson |
| 2012/0206589 A1 | 8/2012 | Crandall |
| 2012/0206880 A1 | 8/2012 | Andres et al. |
| 2012/0218301 A1 | 8/2012 | Miller |
| 2012/0227006 A1 | 9/2012 | Amm |
| 2012/0235885 A1 | 9/2012 | Miller et al. |
| 2012/0242561 A1 | 9/2012 | Sugihara |
| 2012/0242798 A1 | 9/2012 | Mcardle et al. |
| 2012/0249797 A1 | 10/2012 | Haddick et al. |
| 2012/0256856 A1 | 10/2012 | Suzuki et al. |
| 2012/0256963 A1 | 10/2012 | Suzuki et al. |
| 2012/0287381 A1 | 11/2012 | Li et al. |
| 2012/0292535 A1 | 11/2012 | Choi et al. |
| 2013/0000871 A1 | 1/2013 | Olson et al. |
| 2013/0027772 A1 | 1/2013 | Large |
| 2013/0033485 A1 | 2/2013 | Kollin et al. |
| 2013/0081779 A1 | 4/2013 | Liao et al. |
| 2013/0093741 A1 | 4/2013 | Akimoto et al. |
| 2013/0106674 A1 | 5/2013 | Wheeler et al. |
| 2013/0162673 A1 | 6/2013 | Bohn |
| 2013/0163089 A1 | 6/2013 | Bohn |
| 2013/0170031 A1 | 7/2013 | Bohn |
| 2013/0186596 A1 | 7/2013 | Rubenstein |
| 2013/0186598 A1 | 7/2013 | Rubenstein |
| 2013/0187943 A1 | 7/2013 | Bohn et al. |
| 2013/0201285 A1 | 8/2013 | Mao et al. |
| 2013/0207896 A1 | 8/2013 | Robinson et al. |
| 2013/0207964 A1 | 8/2013 | Fleck |
| 2013/0208003 A1 | 8/2013 | Bohn |
| 2013/0208362 A1 | 8/2013 | Bohn |
| 2013/0208482 A1 | 8/2013 | Fleck |
| 2013/0215081 A1 | 8/2013 | Levin et al. |
| 2013/0242056 A1 | 9/2013 | Fleck |
| 2013/0242555 A1 | 9/2013 | Mukawa |
| 2013/0250431 A1 | 9/2013 | Robbins et al. |
| 2013/0252628 A1 | 9/2013 | Kuehnel |
| 2013/0257848 A1 | 10/2013 | Westerinen et al. |
| 2013/0258701 A1 | 10/2013 | Westerinen et al. |
| 2013/0267309 A1 | 10/2013 | Robbins |
| 2013/0294030 A1 | 11/2013 | Wang et al. |
| 2013/0307875 A1 | 11/2013 | Anderson |
| 2013/0314793 A1 | 11/2013 | Robbins |
| 2013/0322810 A1 | 12/2013 | Robbins |
| 2013/0332159 A1 | 12/2013 | Federighi et al. |
| 2013/0335671 A1 | 12/2013 | Fleck |
| 2013/0342674 A1 | 12/2013 | Dixon |
| 2014/0010265 A1 | 1/2014 | Peng |
| 2014/0041827 A1 | 2/2014 | Giaimo |
| 2014/0078130 A1 | 3/2014 | Uchino et al. |
| 2014/0094973 A1 | 4/2014 | Giaimo |
| 2014/0104665 A1 | 4/2014 | Popovich et al. |
| 2014/0104685 A1 | 4/2014 | Bohn |
| 2014/0111865 A1 | 4/2014 | Kobayashi |
| 2014/0140653 A1 | 5/2014 | Brown et al. |
| 2014/0140654 A1 | 5/2014 | Brown et al. |
| 2014/0176528 A1 | 6/2014 | Robbins |
| 2014/0184699 A1 | 7/2014 | Ito et al. |
| 2014/0204455 A1 | 7/2014 | Popovich |
| 2014/0240842 A1 | 8/2014 | Nguyen et al. |
| 2016/0033697 A1 | 2/2016 | Sainiemi et al. |
| 2016/0035539 A1 | 2/2016 | Sainiemi et al. |

(56) References Cited

U.S. PATENT DOCUMENTS

| | | |
|---|---|---|
| 2016/0231570 A1 | 8/2016 | Levola et al. |
| 2016/0234485 A1 | 8/2016 | Robbins et al. |
| 2016/0282625 A1 | 9/2016 | Fleck et al. |

FOREIGN PATENT DOCUMENTS

| | | |
|---|---|---|
| CN | 101589326 | 11/2009 |
| CN | 101881936 | 11/2010 |
| CN | 102004315 | 4/2011 |
| DE | 102007021036 | 11/2008 |
| EP | 0977022 | 2/2000 |
| EP | 1494109 | 1/2005 |
| EP | 2065750 | 6/2009 |
| EP | 2112547 | 10/2009 |
| EP | 2216678 | 1/2010 |
| JP | H0422358 | 1/1992 |
| JP | 7311303 | 11/1995 |
| JP | 2001078234 | 3/2001 |
| JP | 2008017135 | 1/2008 |
| KR | 20090076539 | 7/2009 |
| KR | 20110070087 | 6/2011 |
| KR | 20120023458 | 3/2012 |
| WO | WO-9418595 | 8/1994 |
| WO | WO-0133282 | 5/2001 |
| WO | WO-0195027 | 12/2001 |
| WO | WO-03090611 | 11/2003 |
| WO | WO-2006054056 | 5/2006 |
| WO | WO-2008021504 | 2/2008 |
| WO | WO-2009077601 | 6/2009 |
| WO | WO-2010125337 | 11/2010 |
| WO | WO-2011003381 | 1/2011 |
| WO | WO-2011051660 | 5/2011 |
| WO | WO-2011090455 | 7/2011 |
| WO | WO-2011110728 | 9/2011 |
| WO | WO 2011110728 | 9/2011 |
| WO | WO-2011131978 | 10/2011 |
| WO | WO-2012172295 | 12/2012 |
| WO | WO-2013164665 | 11/2013 |
| WO | WO-2014130383 | 8/2014 |

OTHER PUBLICATIONS

"Augmented Reality and Physical Games", U.S. Appl. No. 13/440,165, filed Apr. 5, 2012, 49 pages.
"BragGrate Mirror", Retrieved from <http://web.archive.org/web/20090814104232/http://www.optigrate.com/BragGrate_Mirror.html> on Jul. 8, 2014, Aug. 14, 2009, 2 pages.
"Corrected Final Office Action", U.S. Appl. No. 13/432,311, Dec. 24, 2014, 25 pages.
"Corrected Notice of Allowance", U.S. Appl. No. 13/355,836, Sep. 11, 2014, 2 pages.
"Corrected Notice of Allowance", U.S. Appl. No. 13/355,836, Dec. 15, 2014, 2 pages.
"DigiLens", SBG Labs, retrieved from <http://www.digilens.com/products.html> on Jun. 19, 2012, 1 page.
"Final Office Action", U.S. Appl. No. 13/336,873, Jan. 5, 2015, 21 pages.
"Final Office Action", U.S. Appl. No. 13/336,895, May 27, 2014, 11 pages.
"Final Office Action", U.S. Appl. No. 13/355,836, Mar. 10, 2014, 18 pages.
"Final Office Action", U.S. Appl. No. 13/355,914, Feb. 23, 2015, 21 pages.
"Final Office Action", U.S. Appl. No. 13/355,914, Jun. 19, 2014, 11 pages.
"Final Office Action", U.S. Appl. No. 13/397,495, May 29, 2014, 10 pages.
"Final Office Action", U.S. Appl. No. 13/397,516, Jan. 29, 2015, 13 pages.
"Final Office Action", U.S. Appl. No. 13/428,879, Jul. 14, 2014, 12 pages.
"Final Office Action", U.S. Appl. No. 13/432,311, Dec. 15, 2014, 24 pages.
"Final Office Action", U.S. Appl. No. 13/432,372, Jan. 29, 2015, 33 pages.
"Final Office Action", U.S. Appl. No. 13/440,165, Jun. 6, 2014, 12 pages.
"Final Office Action", U.S. Appl. No. 13/477,646, Feb. 23, 2015, 36 pages.
"Final Office Action", U.S. Appl. No. 13/477,646, May 5, 2014, 26 pages.
"Final Office Action", U.S. Appl. No. 13/525,649, Oct. 9, 2014, 8 pages.
"Final Office Action", U.S. Appl. No. 14/134,993, Aug. 20, 2014, 15 pages.
"Foreign Notice of Allowance", CN Application No. 201320034345.X, Aug. 14, 2013, 2 Pages.
"Foreign Office Action", CN Application No. 201210563730.3, Jan. 7, 2015, 16 pages.
"Foreign Office Action", CN Application No. 201210567932.5, Aug. 14, 2014, 12 pages.
"HDTV Helmet Mounted Display", Available at <http://defense-update.com/products/h/HDTV-HMD.htm>,Jan. 26, 2005, 1 page.
"International Search Report and Written Opinion", Application No. PCT/US2014/016658, 10 pages.
"International Search Report and Written Opinion", Application No. PCT/US2012/069331, Mar. 29, 2013, 10 pages.
"International Search Report and Written Opinion", Application No. PCT/US2013/053676, Oct. 16, 2013, 10 pages.
"International Search Report and Written Opinion", Application No. PCT/US2013/030632, Jun. 26, 2013, 10 pages.
"International Search Report and Written Opinion", Application No. PCT/US2013/028477, Jun. 21, 2013, 11 pages.
"International Search Report and Written Opinion", Application No. PCT/US2013/031111, Jun. 26, 2013, 11 pages.
"International Search Report and Written Opinion", Application No. PCT/US2013/076832, Mar. 17, 2014, 12 pages.
"International Search Report and Written Opinion", Application No. PCT/US2013/061225, Jun. 4, 2014, 12 pages.
"International Search Report and Written Opinion", Application No. PCT/US2012/071563, Apr. 25, 2013, 13 pages.
"International Search Report and Written Opinion", Application No. PCT/US2013/021784, Apr. 30, 2013, 9 pages.
"International Search Report and Written Opinion", Application No. PCT/US2012/069330, Mar. 28, 2013, 9 pages.
"International Search Report and Written Opinion", Application No. PCT/US2013/021783, May 15, 2013, 9 pages.
"International Search Report and Written Opinion", Application No. PCT/US2013/026200, Jun. 3, 2013, 9 pages.
"Light Guide Techniques using LED Lamps", Application Brief I-003, retrieved from <http://www.ciri.org.nz/downloads/Lightpipe%20design.pdf> on Jan. 12, 2012,Oct. 14, 2008, 22 pages.
"Non-Final Office Action", U.S. Appl. No. 13/397,495, Nov. 13, 2013, 8 pages.
"Non-Final Office Action", U.S. Appl. No. 13/440,165, Feb. 6, 2014, 12 pages.
"Non-Final Office Action", U.S. Appl. No. 13/336,873, Jul. 25, 2014, 16 pages.
"Non-Final Office Action", U.S. Appl. No. 13/336,895, Oct. 24, 2013, 9 pages.
"Non-Final Office Action", U.S. Appl. No. 13/343,675, Jul. 16, 2013, 9 pages.
"Non-Final Office Action", U.S. Appl. No. 13/355,836, Nov. 4, 2013, 15 pages.
"Non-Final Office Action", U.S. Appl. No. 13/355,914, Feb. 14, 2014, 10 pages.
"Non-Final Office Action", U.S. Appl. No. 13/355,914, Oct. 28, 2014, 18 pages.
"Non-Final Office Action", U.S. Appl. No. 13/397,516, Jun. 12, 2014, 11 pages.
"Non-Final Office Action", U.S. Appl. No. 13/397,516, Nov. 25, 2013, 10 pages.
"Non-Final Office Action", U.S. Appl. No. 13/397,539, Mar. 16, 2015, 9 pages.

(56) References Cited

OTHER PUBLICATIONS

"Non-Final Office Action", U.S. Appl. No. 13/397,617, Oct. 9, 2014, 6 pages.
"Non-Final Office Action", U.S. Appl. No. 13/428,879, Feb. 24, 2015, 10 pages.
"Non-Final Office Action", U.S. Appl. No. 13/428,879, Mar. 17, 2014, 10 pages.
"Non-Final Office Action", U.S. Appl. No. 13/432,311, Jul. 8, 2014, 33 pages.
"Non-Final Office Action", U.S. Appl. No. 13/432,372, May 9, 2014, 26 pages.
"Non-Final Office Action", U.S. Appl. No. 13/432,372, Oct. 24, 2014, 27 pages.
"Non-Final Office Action", U.S. Appl. No. 13/440,165, Feb. 13, 2015, 10 pages.
"Non-Final Office Action", U.S. Appl. No. 13/440,165, Oct. 16, 2014, 11 pages.
"Non-Final Office Action", U.S. Appl. No. 13/477,646, Oct. 6, 2014, 34 pages.
"Non-Final Office Action", U.S. Appl. No. 13/477,646, Nov. 22, 2013, 20 pages.
"Non-Final Office Action", U.S. Appl. No. 13/525,649, Jan. 29, 2014, 7 pages.
"Non-Final Office Action", U.S. Appl. No. 13/525,649, Feb. 5, 2015, 7 pages.
"Non-Final Office Action", U.S. Appl. No. 13/525,649, Jun. 5, 2014, 7 pages.
"Non-Final Office Action", U.S. Appl. No. 13/570,073, Jan. 23, 2015, 7 pages.
"Non-Final Office Action", U.S. Appl. No. 13/631,308, Feb. 23, 2015, 9 pages.
"Non-Final Office Action", U.S. Appl. No. 13/774,875, Nov. 24, 2014, 8 pages.
"Non-Final Office Action", U.S. Appl. No. 14/134,993, Jan. 22, 2015, 17 pages.
"Non-Final Office Action", U.S. Appl. No. 14/134,993, Apr. 17, 2014, 34 pages.
"Notice of Allowance", U.S. Appl. No. 13/336,895, Aug. 11, 2014, 6 pages.
"Notice of Allowance", U.S. Appl. No. 13/343,675, Sep. 16, 2013, 8 pages.
"Notice of Allowance", U.S. Appl. No. 13/355,836, Jun. 13, 2014, 11 pages.
"Notice of Allowance", U.S. Appl. No. 13/355,836, Oct. 8, 2014, 11 pages.
"Notice of Allowance", U.S. Appl. No. 13/356,545, Mar. 28, 2014, 6 pages.
"Notice of Allowance", U.S. Appl. No. 13/488,145, Nov. 19, 2014, 8 pages.
"Restriction Requirement", U.S. Appl. No. 13/355,836, Sep. 27, 2013, 6 pages.
"Restriction Requirement", U.S. Appl. No. 13/397,539, Dec. 1, 2014, 6 pages.
"Restriction Requirement", U.S. Appl. No. 13/488,145, Sep. 8, 2014, 14 pages.
"Restriction Requirement", U.S. Appl. No. 13/570,073, Nov. 18, 2014, 7 pages.
"Supplemental Notice of Allowance", U.S. Appl. No. 13/356,545, Jul. 22, 2014, 2 pages.
"Two-Faced: Transparent Phone with Dual Touch Screens", Retrieved from <http://gajitz.com/two-faced-transparent-phone-with-dual-touch-screens/>, Jun. 7, 2012, 3 pages.
"Written Opinion", Application No. PCT/US2013/061225, Oct. 10, 2014, 6 Pages.
Allen, "ELiXIR—Solid-State Luminaire with Enhanced Light Extraction by Internal Reflection", Journal of Display Technology, vol. 3, No. 2, Available at <http://www.nanolab.uc.edu/Publications/PDFfiles/355.pdf>,Jun. 2007, pp. 155-159.
Aron, "'Sprinting' chips could push phones to the speed limit", New Scientist, Feb. 20, 2012, Issue #2852, Feb. 20, 2012, 2 pages.

Baluja, et al., "Non-Intrusive Gaze Tracking Using Artificial Neural Networks", Technical Report CMU-CS-94-102, Available at <http://citeseerx.ist.psu.edu/viewdoc/download?doi=10.1.1.33.4027&rep=rep1&type=pdf>,Jan. 5, 1994, 14 pages.
Barger "COTS Cooling", Publication of the National Electronics Manufacturing Center of Excellence, Retrieved from: <http://www.empf.org/empfasis/2009/Oct09/cots.html > on Jul. 9, 2012,Oct. 2009, 4 pages.
Baudisch, et al., "Back-of-Device Interaction Allows Creating Very Small Touch Devices", In Proceedings of 27th International Conference on Human Factors in Computing Systems, Retrieved from <http://citeseerx.ist.psu.edu/viewdoc/download?doi=10.1.1.160.3337&rep=rep1&type=pdf>,Apr. 2005, 10 pages.
Baxtor, "TwinTech GeForce GTS 250 XT OC 1GB Graphics Card", retrieved from <http://www.tweaktown.com/reviews/2733/twintech_geforce_gts_250_xt_oc_1gb_graphics_card/index3.html> on Dec. 30, 2011,Apr. 24, 2009, 4 pages.
Chen, et al., "Strategies for 3D Video with Wide Fields-of-View", IEEE Proceeding Optoelectronics, vol. 148, Issue 2, Available at <http://ieeexplore.ieee.org/stamp/stamp.jsp?tp=&arnumber=926823>,Apr. 2001, pp. 85-90.
Cheng, et al., "Waveguide Displays Based on Polymer-dispersed Liquid Crystals", SPIE Newsroom, Available at <http://spie.org/documents/Newsroom/Imported/003805/003805_10.pdf>,Aug. 12, 2011, 2 pages.
Chirgwin, "Researchers propose 'overclock' scheme for mobiles—Processing at a sprint to overcome tech limitations", The Register, Feb. 21, 2012, Feb. 21, 2012, 2 pages.
Coldewey, "Researchers Propose "Computational Sprinting" to Speed Up Chips by 1000%—But Only for a Second", TechCrunch, Feb. 28, 2012, Feb. 29, 2012, 2 pages.
Deagazio, "Selecting Display Backlighting for Portable, Handheld Devices", Hearst Electronics Products, retrieved from <http://www2.electronicproducts.com/Selecting_display_backlighting_for_portable_handheld_devices-article-farcglobal-feb2008-html.aspx> on Jan. 12, 2012,Jan. 2, 2008, 4 pages.
Eadicicco, "First Transparent Tablet Lets You Touch From Both Sides", Retrieved from <http://blog.laptopmag.com/first-transparent-tablet>, Dec. 26, 2013, 4 pages.
Greenemeier, "Could "Computational Sprinting" Speed Up Smart Phones without Burning Them Out?", Scientific American, Feb. 29, 2012, Feb. 29, 2012, 2 pages.
Hua, et al., "Engineering of Head-mounted Projective Displays", In Proceedings of Applied Optics, vol. 39, No. 22, Aug. 1, 2000, 11 pages.
Jacques, et al., "Polarized Light Imaging of Tissue", Available at <http://www.lumamed.com/documents/5_polarized%20light%20imaging.pdf>,2004, 17 pages.
Jarvenpaa, et al., "Compact near-to-eye display with integrated gaze tracker", Second International Conference on Computer Engineering and Applications, Mar. 19, 2010, 9 pages.
Jaworski, et al., "A Novel Design of Heat Sink with PCM for Electronics Cooling", 10th International Conference on Thermal Energy Storage, Stockton, May 31-Jun. 2, 2006, retrieved from <https://intraweb.stockton.edu/eyos/energy_studies/content/docs/FINAL_PRESENTATIONS/4b-6%20.pdf> on Jan. 5, 2012,May 31, 2006, 8 pages.
Karp, et al., "Planar Micro-optic Solar Concentration using Multiple Imaging Lenses into a Common Slab Waveguide", In Proceedings of SPIE vol. 7407, Available at <http://psilab.ucsd.edu/research/slab_concentration/files/SPIE_Slab_Published.pdf>,Jan. 2009, 11 pages.
Krishnan, et al., "A Novel Hybrid Heat Sink Using Phase Change Materials for Transient Thermal Management of Electronics", IEEE transactions on components and packaging technologies, vol. 28, No. 2, retrieved from <http://ieeexplore.ieee.org/stamp/stamp.jsp?tp=&arnumber=1432936> on Jan. 5, 2012,Jun. 2005, pp. 281-289.
Lanman, et al., "Near-eye Light Field Displays", In Journal of ACM Transactions on Graphics, vol. 32, No. 6, Nov. 2013, 10 pages.
Large, et al., "Parallel Optics in Waveguide Displays: a Flat Panel Autostereoscopic", Display Technology, Journal of, Retrieved from <http://download.microsoft.com/download/D/2/E/D2E425F8-

(56) References Cited

OTHER PUBLICATIONS

CF3C-4C71-A4A2-70F9D4081007/ParallelOpticsinWaveguideDisplaysMS090925.Final.pdf>,Jun. 21, 2010, pp. 1-7.

Lerner, "Penn Helps Rethink Smartphone Design With 'Computational Sprinting'", Penn News Release, Feb. 28, 2012, 2 pages.

Li, et al., "Design Optimization of Reflective Polarizers for LCD Backlight Recycling", Journal of Display Technology, vol. 5, No. 8, Available at <http://ieeexplore.ieee.org/stamp/stamp.jsp?tp=&arnumber=5196840 >,Aug. 2009, pp. 335-340.

Li, et al., "Switchable Electro-optic Diffractive Lens with High Efficiency for Ophthalmic Applications", PNAS Apr. 18, 2006 vol. 103 No. 16 6100-6104, Retrieved from: <http://www.pnas.org/content/103/16/6100.long> Feb. 22, 2012,Feb. 2, 2006, 4 pages.

Man, et al., "IT Equipment Noise Emission Standards: Overview of New Development in the Next Edition of ISO/ECMA Standards", In Proceedings of 37th International Congress and Exposition on Noise Control Engineering, Available at <http://www.ecma-international.org/activities/Acoustics/Inter-noise%202008%20paper%20on%20ECMA-74%20updates.pdf >,Oct. 26, 2008, 8 pages.

McMillan, "Your Future iPhone May Be Stuffed With Wax", Aug. 23, 2013, 3 pages.

Melcher, "LCoS for High Performance Displays", In Proceedings of LEOS 2003, Available at <http://ieeexplore.ieee.org/stamp/stamp.jsp?tp=&arnumber=1253048>,Oct. 27, 2003, pp. 812-813.

Moore, "Computational sprinting pushes smartphones till they're tired", Michigan News Release, Feb. 28, 2012, 2 pages.

Nguyen, et al., "Advanced Cooling System Using Miniature Heat Pipes in Mobile PC", IEEE Transactions on Components and Packaging Technology, vol. 23, No. 1, Available at <http://ieeexplore.ieee.org/stamp/stamp.jsp?tp=&arnumber=833046&userType=inst>,Mar. 2000, pp. 86-90.

Owano, "Study explores computing bursts for smartphones", PhysOrg.com, Feb. 21, 2012, Feb. 21, 2012, 2 pages.

Papaefthymiou, et al., "Computational Sprinting on a Hardware/Software Testbed", In the Proceedings of the 18th Eighteenth International Conference on Architectural Support for Programming Languages and Operating Systems (ASPLOS), Mar. 2013., Mar. 2013, 12 pages.

Patrizio, "Researchers Working on Ways to Put 16-Core Processors in Smartphones", Brighthand, Mar. 18, 2012, Mar. 18, 2012, 2 pages.

Raghavan, et al., "Computational Sprinting", In the Proceedings of the 18th Symposium on High Performance Computer Architecture (HPCA), Feb. 2012, Feb. 2012, 12 pages.

Raghavan, et al., "Designing for Responsiveness With Computational Sprinting", IEEE Micro's "Top Picks of 2012" Issue, May 2013, 8 pages.

Scott, et al., "RearType: Text Entry Using Keys on the Back of a Device", In Proceedings of 12th Conference on Human-Computer Interaction with Mobile Devices and Services, Retrieved from <https://research.microsoft.com/pubs/135609/reartype%20mobilehci.pdf>,Sep. 7, 2010, 9 pages.

Singh et al., "Laser-Based Head-Tracked 3D Display Research", Journal of Display Technology, vol. 6, No. 10, Available at <http://ieeexplore.ieee.org/stamp/stamp.jsp?tp=&arnumber=5462999>,Oct. 2010, pp. 531-543.

Stupar, et al., "Optimization of Phase Change Material Heat Sinks for Low Duty Cycle High Peak Load Power Supplies", IEEE transactions on components, packaging and manufacturing technology, retrieved from <http://ieeexplore.ieee.org/stamp/stamp.jsp?tp=&arnumber=6081913> on Jan. 5, 2012,Nov. 15, 2011, 14 pages.

Tari, et al., "CFD Analyses of a Notebook Computer Thermal Management System and a Proposed Passive Cooling Alternative", IEEE Transactions on Components and Packaging Technologies, vol. 33, No. 2, retrieved from <http://ieeexplore.ieee.org/stamp/stamp.jsp?tp=&arnumber=5466211> on Dec. 30, 2011,Jun. 2010, pp. 443-452.

Travis, et al., "Collimated Light from a Waveguide for a Display Backlight", Optics Express, Retrieved from <http://download.microsoft.com/download/D/2/E/D2E425F8-CF3C-4C71-A4A2-70F9D4081007/OpticsExpressbacklightpaper.pdf>,Oct. 15, 2009, pp. 19714-19719.

Travis, et al., "The Design of Backlights for View-Sequential 3D", Microsoft Corporation, Available at <http://download.microsoft.com/download/D/2/E/D2E425F8-CF3C-4C71-A4A2-70F9D4081007/Backlightforviewsequentialautostereo.docx>,Jul. 3, 2010, 4 pages.

Van, "A Survey of Augmented Reality Technologies, Applications and Limitations", The International Journal of Virtual Reality, 2010, 9(2), Available at <http://www.ijvr.org/issues/issue2-2010/paper1%20.pdf>,Jun. 2010, pp. 1-19.

Walker, "Thermalright Ultra-120 Extreme CPU Cooler", retrieved from <http://www.pro-clockers.com/cooling/66-thermalright-ultra-120-extreme-cpu-cooler.html> on Dec. 30, 2011,Jul. 2, 2009, 7 pages.

Westerinen, et al., "Light Guide Display and Field of View", U.S. Appl. No. 13/428,879, filed Mar. 23, 2012, 46 pages.

Wigdor, et al., "LucidTouch: A See-Through Mobile Device", In Proceedings of 20th Annual ACM symposium on User Interface Software and Technology, Retrieved from <http://dl.acm.org/citation.cfm?id=1294259>,Oct. 7, 2007, 10 pages.

"Foreign Office Action", EP Application No. 13769961.7, Mar. 11, 2015, 8 pages.

"Non-Final Office Action", U.S. Appl. No. 13/336,873, Apr. 9, 2015, 18 pages.

"Non-Final Office Action", U.S. Appl. No. 13/397,495, Apr. 3, 2015, 11 pages.

"Non-Final Office Action", U.S. Appl. No. 13/397,617, May 5, 2015, 6 pages.

"Non-Final Office Action", U.S. Appl. No. 13/432,311, Jun. 2, 2015, 25 pages.

"Non-Final Office Action", U.S. Appl. No. 13/722,917, May 21, 2015, 12 pages.

"Supplementary European Search Report", EP Application No. 13769961.7, Mar. 3, 2015, 3 pages.

Han,"Accurate diffraction efficiency control for multiplexed volume holographic gratings", Retrieved at: opticalengineering.spiedigitallibrary.org/data/Journals/. . . /2799_1, 2002, 4 pages.

Kress,"Exit Pupil for Wearable See-through displays", Downloaded From: http://proceedings.spiedigitallibrary.org/ on Jan. 31, 2015 Terms of Use: http://spiedl.org/terms, 2012, 8 pages.

Massenot,"Multiplexed holographic transmission gratings recorded in holographic polymer-dispersed liquid crystals: static and dynamic studies", Retrieved at: http://oatao.univ-toulouse.fr/2874/, 2005, 8 pages.

Minier,"Diffraction Characteristics of Superimposed Holographic gratings in Planar Optical waveguides", IEEE Photonics Technology Letters, vol. 4, No. 10, Oct. 1992, 4 pages.

Pu,"Exposure schedule for multiplexing holograms in photopolymer films", Retrieved at: lo.epfl.ch/webdav/site/lo/shared/1996/OE_35_2824_Oct1996.pdf, Oct. 1996, 6 pages.

Yan,"Multiplexing holograms in the photopolymer with equal diffraction efficiency", 2005, 9 pages.

Zharkova,"Study of the Dynamics of Transmission Gratings Growth on Holographic Polymer-Dispersed Liquid Crystals", International Conference on Methods of Aerophysical Research, ICMAR 2008, 2008, 4 pages.

"Corrected Notice of Allowance", U.S. Appl. No. 13/397,516, May 16, 2016, 2 pages.

"Final Office Action", U.S. Appl. No. 13/722,917, Jun. 17, 2016, 19 pages.

"Final Office Action", U.S. Appl. No. 13/774,875, Apr. 22, 2016, 10 pages.

"Foreign Office Action", CN Application No. 201380017348.5, Jun. 17, 2016, 7 pages.

"International Search Report and Written Opinion", Application No. PCT/US2016/015873, May 23, 2016, 11 pages.

"Non-Final Office Action", U.S. Appl. No. 13/397,617, May 18, 2016, 8 pages.

"Non-Final Office Action", U.S. Appl. No. 14/617,606, May 23, 2016, 12 pages.

(56) References Cited

OTHER PUBLICATIONS

"Non-Final Office Action", U.S. Appl. No. 15/171,924, Jul. 13, 2016, 8 pages.
"Corrected Notice of Allowance", U.S. Appl. No. 13/336,873, Nov. 27, 2015, 4 pages.
"Final Office Action", U.S. Appl. No. 13/397,617, Nov. 18, 2015, 11 pages.
"Final Office Action", U.S. Appl. No. 13/477,646, Nov. 24, 2015, 39 pages.
"International Search Report and Written Opinion", Application No. PCT/US2015/041900, Oct. 21, 2015, 12 pages.
"International Search Report and Written Opinion", Application No. PCT/US2015/041909, Oct. 20, 2015, 13 pages.
"Non-Final Office Action", U.S. Appl. No. 13/397,539, Oct. 1, 2015, 12 pages.
"Non-Final Office Action", U.S. Appl. No. 13/420,388, Dec. 4, 2015, 7 pages.
"Non-Final Office Action", U.S. Appl. No. 13/774,875, Sep. 16, 2015, 8 pages.
"Notice of Allowance", U.S. Appl. No. 13/397,495, Oct. 20, 2015, 6 pages.
"Notice of Allowance", U.S. Appl. No. 14/134,993, Nov. 17, 2015, 9 pages.
Ando,"Development of Three-Dimensional Microstages Using Inclined Deep-Reactive Ion Etching", Journal of Microelectromechanical Systems, Jun. 1, 2007, 10 pages.
Gila,"First Results From a Multi-Ion Beam Lithography and Processing System at the University of Florida", AIP Conference Proceedings, Jun. 1, 2011, 6 pages.
"Advisory Action", U.S. Appl. No. 13/432,311, Mar. 24, 2016, 3 pages.
"Corrected Notice of Allowance", U.S. Appl. No. 13/397,495, Mar. 3, 2016, 4 pages.
"Corrected Notice of Allowance", U.S. Appl. No. 13/397,516, Mar. 3, 2016, 2 pages.
"Final Office Action", U.S. Appl. No. 13/397,539, Apr. 21, 2016, 14 pages.
"Final Office Action", U.S. Appl. No. 13/420,388, Apr. 21, 2016, 9 pages.
"International Search Report and Written Opinion", Application No. PCT/US2016/015496, Apr. 11, 2016, 11 pages.
"Non-Final Office Action", U.S. Appl. No. 13/440,165, Mar. 28, 2016, 13 pages.
"Supplemental Notice of Allowance", U.S. Appl. No. 14/134,993, Mar. 2, 2016, 6 pages.
"Final Office Action", U.S. Appl. No. 13/397,539, Jun. 29, 2015, 11 pages.
"Final Office Action", U.S. Appl. No. 13/440,165, Jul. 21, 2015, 11 pages.
"Final Office Action", U.S. Appl. No. 13/774,875, Jun. 4, 2015, 10 pages.
"Final Office Action", U.S. Appl. No. 14/134,993, Jul. 16, 2015, 19 pages.
"Foreign Office Action", EP Application No. 13765041.2, Aug. 5, 2015, 6 pages.
"Foreign Office Action", EP Application No. 13769961.7, Jun. 30, 2015, 6 pages.
"Non-Final Office Action", U.S. Appl. No. 13/428,879, Jun. 26, 2015, 13 pages.
"Non-Final Office Action", U.S. Appl. No. 13/477,646, Jun. 18, 2015, 43 pages.
"Notice of Allowance", U.S. Appl. No. 13/336,873, Jul. 31, 2015, 6 pages.
"Foreign Office Action", CN Application No. 201380015757.1, Jul. 11, 2016, 13 pages.
"Foreign Office Action", CN Application No. 201380017348.5, Jan. 14, 2016, 12 pages.
"Foreign Office Action", EP Application No. 13765041.2, Aug. 4, 2016, 5 pages.
"Non-Final Office Action", U.S. Appl. No. 13/432,311, Aug. 17, 2016, 18 pages.
"Corrected Notice of Allowance", U.S. Appl. No. 13/336,873, Sep. 11, 2015, 4 pages.
"Final Office Action", U.S. Appl. No. 13/722,917, Sep. 23, 2015, 14 pages.
"Non-Final Office Action", U.S. Appl. No. 13/397,516, Sep. 24, 2015, 14 pages.
"Final Office Action", U.S. Appl. No. 13/428,879, Dec. 10, 2015, 16 pages.
"Final Office Action", U.S. Appl. No. 13/432,311, Dec. 18, 2015, 9 pages.
"Non-Final Office Action", U.S. Appl. No. 13/722,917, Feb. 9, 2016, 17 pages.
"Notice of Allowance", U.S. Appl. No. 13/397,516, Feb. 1, 2016, 7 pages.
"Supplemental Notice of Allowance", U.S. Appl. No. 13/397,495, Jan. 26, 2016, 4 pages.
"Supplemental Notice of Allowance", U.S. Appl. No. 14/447,464, Jan. 12, 2016, 2 pages.
"Restriction Requirement", U.S. Appl. No. 13/420,388, Aug. 13, 2015, 6 pages.
"Supplementary European Search Report", EP Application No. 13765041.2, Jul. 21, 2015, 3 pages.
"Examiner's Answer to Appeal Brief", U.S. Appl. No. 13/428,879, Oct. 12, 2016, 18 pages.
"Examiner's Answer to Appeal Brief", U.S. Appl. No. 13/477,646, Oct. 26, 2016, 12 pages.
"Final Office Action", U.S. Appl. No. 13/397,617, Sep. 21, 2016, 10 pages.
"Foreign Office Action", CN Application No. 201380067523.1, Aug. 22, 2016, 13 pages.
"Non-Final Office Action", U.S. Appl. No. 13/397,539, Sep. 9, 2016, 16 pages.
"Non-Final Office Action", U.S. Appl. No. 13/440,165, Sep. 22, 2016, 13 pages.
"Non-Final Office Action", U.S. Appl. No. 14/617,606, Sep. 9, 2016, 12 pages.
"Notice of Allowance", U.S. Appl. No. 13/420,388, Oct. 6, 2016, 5 pages.
"Notice of Allowance", U.S. Appl. No. 15/171,924, Oct. 21, 2016, 8 pages.
"Corrected Notice of Allowance", U.S. Appl. No. 15/171,924, Nov. 30, 2016, 2 pages.
"Final Office Action", U.S. Appl. No. 14/617,606, Dec. 27, 2016, 13 pages.
"Foreign Office Action", CN Application No. 201380017348.5, Oct. 18, 2016, 7 pages.
"Non-Final Office Action", U.S. Appl. No. 13/722,917, Dec. 6, 2016, 18 pages.

* cited by examiner

MULTIPLE WAVEGUIDE IMAGING STRUCTURE

RELATED APPLICATION

This application is a continuation of and claims priority to U.S. patent application Ser. No. 13/488,145 filed Jun. 4, 2012 entitled "Multiple Waveguide Imaging Structure" the disclosure of which is incorporated by reference herein in its entirety.

BACKGROUND

Virtual reality can be viewed as a computer-generated simulated environment in which a user has an apparent physical presence. A virtual reality experience can be generated in 3D and viewed with a head-mounted display (HMD), such as glasses or other wearable display device that has near-eye display panels as lenses to display a virtual reality environment, which replaces the actual environment. Augmented reality, however, provides that a user can still see through the display lenses of the glasses or other wearable display device to view the surrounding environment, yet also see images of virtual objects that are generated for display and appear as a part of the environment. Augmented reality can include any type of input such as audio and haptic inputs, as well as virtual images, graphics, and video that enhances or augments the environment that a user experiences. As an emerging technology, there are many challenges and design constraints with augmented reality, from generation of the virtual objects and images so that they appear realistic in a real environment, to developing the optics small and precise enough for implementation with a wearable display device.

A waveguide display can be implemented in a wearable display device as a near-eye display panel. However, conventional waveguide displays are limited in field of view because of the limited range of angles to propagate light down the waveguide and due to the fixed mechanisms for pushing light into and out of a waveguide. One technique is to stack two waveguides on top of or next to each other with an airspace between the two waveguides. However, disadvantages of this technique include the need for collimation optics for each waveguide, which adds complexity and bulk to a display system. The collimation optics for each waveguide typically add too much bulk for a waveguide display to be implemented as lenses in a wearable display device.

SUMMARY

This Summary introduces simplified concepts of a multiple waveguide imaging structure, and the concepts are further described below in the Detailed Description and/or shown in the Figures. This Summary should not be considered to describe essential features of the claimed subject matter, nor used to determine or limit the scope of the claimed subject matter.

A multiple waveguide imaging structure is described. In embodiments, an imaging structure includes a first waveguide for see-through viewing of an environment at a first field of view, and includes a second waveguide for see-through viewing of the environment at a second field of view. The first and second waveguides each include a polarizing beam splitter to reflect light into the waveguide that enters at a first polarization orientation angle in the respective first and second waveguides, and the polarizing beam splitters pass through the light that enters at a second polarization orientation angle (e.g., at an orthogonal polarization orientation angle). The imaging structure also includes a polarization switch to rotate or cycle the polarization of the light through the first and second polarization orientation angles. The first field of view of the first waveguide is combined with the second field of view of the second waveguide for a wider field of view. The polarization switch rotates the polarization of the light to time-sequentially create the wider field of view.

In embodiments, the light is a virtual image that is generated to appear as part of the environment when viewed through the imaging structure. The light of the virtual image that enters the first and second waveguides at the first polarization orientation angle is propagated in the respective first and second waveguides. The light of the virtual image that enters the first waveguide at the second polarization orientation angle is passed through the first waveguide and is reflected into the second waveguide. The imaging structure includes a half waveplate to change the light that passes through the first waveguide from the second polarization orientation angle back to the first polarization orientation angle, and then the light enters the second waveguide at the first polarization orientation angle.

BRIEF DESCRIPTION OF THE DRAWINGS

Embodiments of a multiple waveguide imaging structure are described with reference to the following Figures. The same numbers may be used throughout to reference like features and components that are shown in the Figures.

DETAILED DESCRIPTION

Embodiments of a multiple waveguide imaging structure are described. An imaging structure can be implemented with multiple waveguides to increase the field of view for near-eye display panels that are used as lenses in a wearable display device. Rather than having collimation optics for each waveguide, which adds too much bulk to a waveguide display lens for a wearable display device, the imaging structure utilizes a polarization switch that rotates the polarization of the light to time-sequentially create an overall wider field of view from combined fields of view of the multiple waveguides. The polarized light that enters into the waveguides of the imaging structure can then be propagated in a waveguide, such as for light that enters at a first polarization orientation angle, or the light can be passed through the waveguide, such as for light that enters at a second polarization orientation angle (e.g., at an orthogonal polarization orientation angle). Embodiments of a multiple waveguide imaging structure can be implemented for virtual-reality and augmented-reality displays, and is also applicable to displays for handheld devices.

While features and concepts of a multiple waveguide imaging structure can be implemented in any number of different devices, systems, environments, and/or configurations, embodiments of a multiple waveguide imaging structure are described in the context of the following example devices, systems, and methods.

Figure 1:
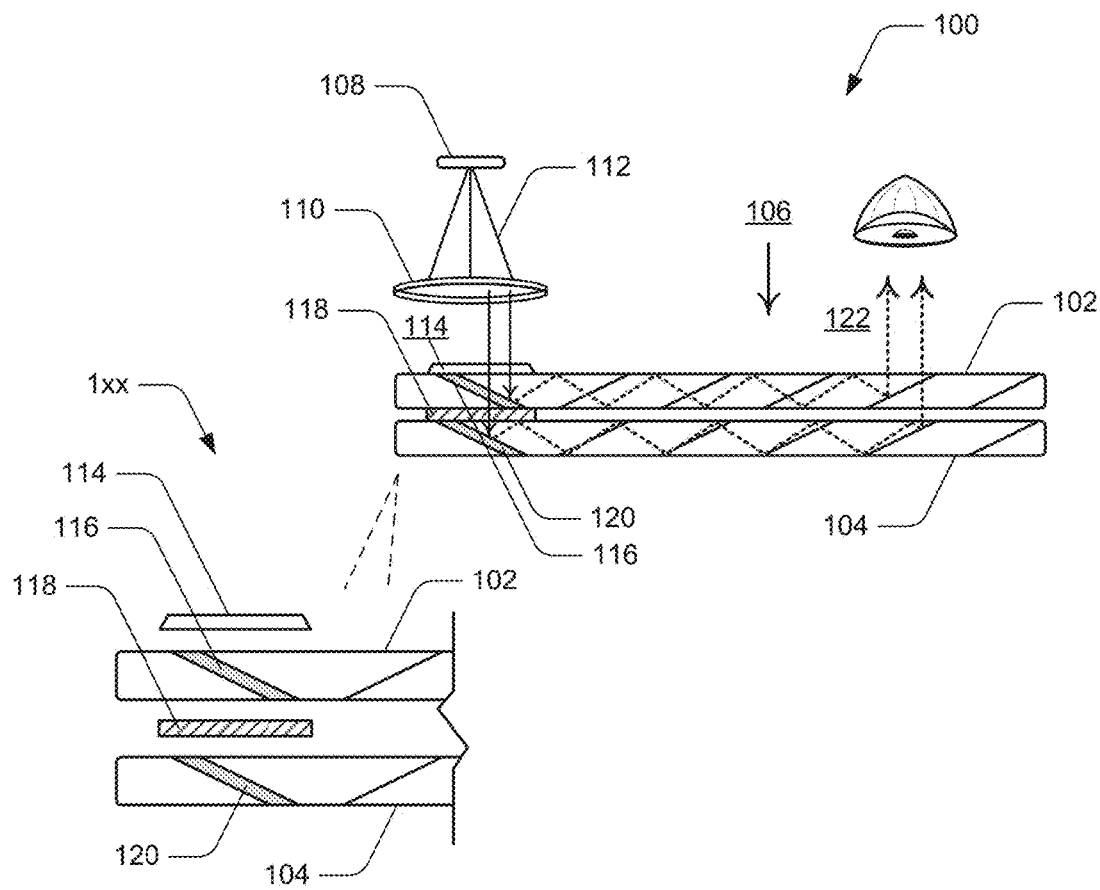
FIG. 1 illustrates an example imaging structure in accordance with one or more embodiments of a multiple waveguide imaging structure.

FIG. 1 illustrates an example imaging structure 100 that is a multiple waveguide imaging structure in accordance with embodiments described herein. The example imaging structure 100 includes a first waveguide 102 and a second waveguide 104 for see-through viewing of an environment that is viewable through the imaging structure, such as for a user viewing the environment from a perspective 106. The imaging structure also includes an image microdisplay 108 and an imaging optic 110 that implements an input mechanism to direct the light 112 of a generated, virtual image into the waveguides where the light of the virtual image is then propagated in the waveguides.

The image microdisplay 108 can be implemented as a liquid crystal on silicon (LCOS) microdisplay that projects the light of the virtual image through the imaging optic 110 into the waveguides. The imaging optic can be implemented as a collimating lens, and the light through the LCOS and imaging optic is polarized. In implementations, the input mechanism (e.g., the image microdisplay 108 and imaging optic 110) may be combined with any other lenses and/or optics components.

The example imaging structure 100 also includes a polarization switch 114 that is implemented to rotate or cycle the polarization of the light 112 through polarization orientation angles before the light is reflected into the waveguides. The waveguides include output reflectors that are angled so that the first waveguide 102 has a first field of view and the second waveguide 104 has a different, second field of view. When combined (e.g., the waveguides are stacked), the first field of view of the first waveguide is combined with the second field of view of the second waveguide for an overall wider field of view. The polarization switch 114 is implemented to rotate the polarization of the light to time-sequentially create the wider field of view based on the combination of the first and second fields of view of the waveguides.

The waveguide 102 includes a polarizing beam splitter 116 or other type of optical filter to reflect the light that enters at a first polarization orientation angle so that the light propagates down the waveguide. The polarizing beam splitter 116 is implemented to also pass through the light that enters the waveguide at a second polarization orientation angle as the polarization switch rotates or cycles the polarization of the light through the first and second polarization orientation angles. The imaging structure 100 also includes a half waveplate 118 that is implemented to change the light (e.g., alter the polarization state of the light) that passes through the first waveguide 102 from the second polarization orientation angle back to the first polarization orientation angle so that the light enters the second waveguide 104 at the first polarization orientation angle. The waveguide 104 also includes a polarizing beam splitter 120 or other type of optical filter to reflect the light that enters at the first polarization orientation angle so that the light propagates down the waveguide.

In embodiments, the imaging structure 100 can be implemented in an imaging unit of a head-mounted display (HMD), such as glasses or other type of wearable display device. An imaging unit that incorporates the imaging structure 100 can generate a virtual image to appear as part of the environment for augmented-reality imaging and/or viewing. Waveguide optics can be implemented to collimate light and then reflect the light into the waveguides by diffractive or reflective components, such as any type of optics, lenses, or other light-directing mechanisms. The components for extracting light out of the waveguides and projecting the light of an image for viewing at 122 can also be diffractive or reflective. In alternate implementations, the waveguides can be implemented with any type of diffractive input devices that are polarization sensitive, such as Switchable Bragg Gratings, Thick Phase Gratings, etc. in embodiments of a multiple waveguide imaging structure.

Figure 2:
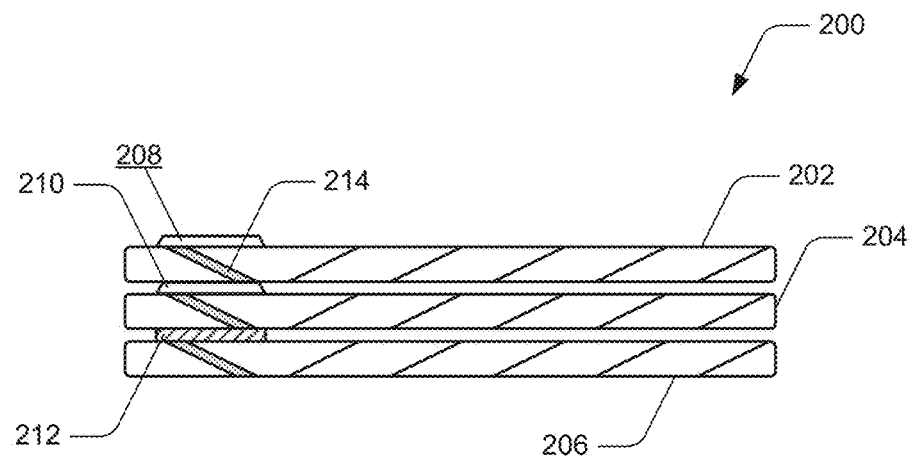
FIG. 2 illustrates another example imaging structure in accordance with one or more embodiments of a multiple waveguide imaging structure.

FIG. 2 further illustrates another example imaging structure 200 that is similar to the example imaging structure 100 shown and described with reference to FIG. 1. The example imaging structure 200 includes a first waveguide 202, a second waveguide 204, and at least a third waveguide 206 for see-through viewing of an environment that is viewable through the imaging structure. The imaging structure 200 also includes polarization switches 208 and 210 to rotate or cycle the polarization of the light through polarization orientation angles before the light is reflected into the waveguides. An example of the polarization switches is described with reference to the polarization switch 114 shown in FIG. 1. Additionally, the imaging structure 200 includes a half waveplate 212 positioned between the second waveguide 204 and the third waveguide 206. An example of the half waveplate is described with reference to the half waveplate 118 shown in FIG. 1.

In addition to polarizing beam splitters 214 (e.g., optical filters), the waveguides include output reflectors that are angled so that the first waveguide 202 has a first field of view, the second waveguide 204 has a different, second field of view, and the third waveguide 206 has another different, third field of view. When combined (e.g., the waveguides are stacked), the first field of view of the first waveguide is combined with the second field of view of the second waveguide and with the third field of view of the third waveguide for an overall wider field of view. Although only three waveguides are implemented in this example imaging structure 200, any number of multiple waveguides can be stacked to increase the overall field of view through the imaging structure. The polarization switches 208 and 210 are implemented to rotate the polarization of the light to time-sequentially create the wider field of view based on the combination of the first, second, and third fields of view of the waveguides.

Figure 3:
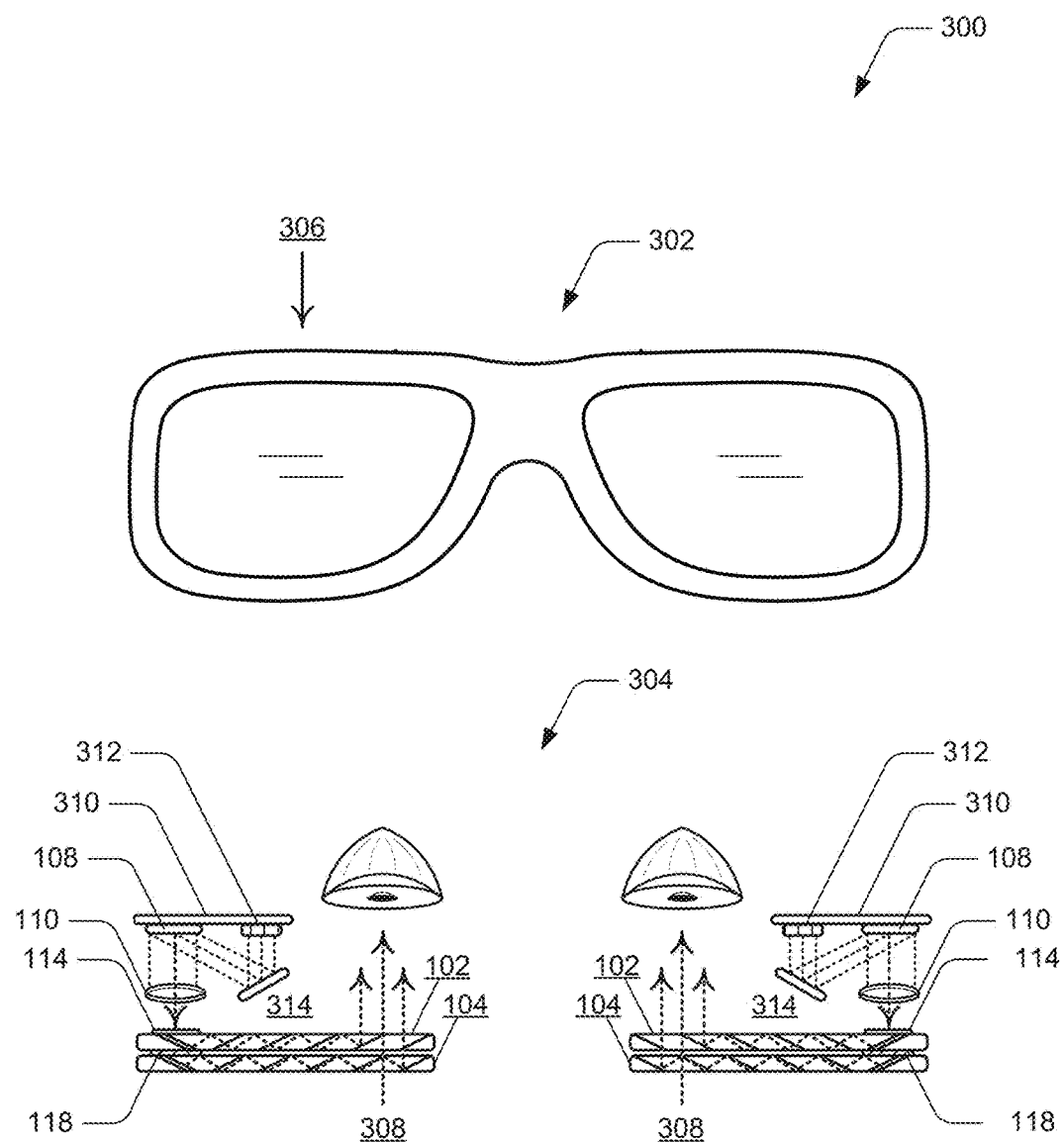
FIG. 3 illustrates an example system that includes examples of imaging units in which embodiments of a multiple waveguide imaging structure can be implemented.

FIG. 3 illustrates an example system 300 in which various embodiments of a multiple waveguide imaging structure can be implemented. An example wearable display device 302 includes left and right display lens systems with imaging units, such as imaging units 304 that are viewed from a perspective 306 of the wearable display device, as if viewing the display lens systems from the top of the device. In embodiments, the imaging units 304 can be implemented as left and right display lens systems of the wearable display device described with reference to FIG. 4. A wearable display device can be implemented as any type of glasses or head-mounted display (HMD) that includes implementations of the imaging units 304 (e.g., left and right display lens systems) through which a user can view the surrounding environment, yet also see virtual images that are generated for display and appear as a part of the environment. References to a left imaging unit and a right imaging unit, as described herein, correlate to a user's left and right eyes (e.g., from the perspective of wearing and looking through the wearable display device). Alternatively, the left and right imaging units may be described from the perspective of looking at the wearable display device.

The imaging units 304 include examples of the imaging structure 100 as shown and described with reference to FIG. 1. For example, the imaging units include the first and second waveguides 102 and 104, as well as the polarization switch 114 and the half waveplate 118. The imaging units also include the input mechanism (e.g., the image microdisplay 108 and imaging optic 110) to direct the light of a virtual image into the waveguides where the light of the virtual image is then propagated through the waveguides. In this example, the imaging units 304 can be implemented with any number of micro display panels, imaging structures with direct emitters, lenses, and reflecting elements to display and project a virtual image into a see-through and reflecting waveguide.

The see-through, reflecting waveguides 102 and 104 are display optics implemented for internal reflection that conduct visible light of a virtual image that is generated by the imaging units 304 and projected for viewing by a user. The waveguides also passes through light 308 of an image from the surrounding environment for viewing by the user (e.g., an image of the environment as viewed through the wearable display device). An imaging unit 304 with an imaging structure can also be implemented with components of the display lens system described with reference to FIG. 4 to implement embodiments of a multiple waveguide imaging structure.

In embodiments, the imaging units 304 each include a printed circuit board 310 that incorporates an emitter structure 312, which direct emits the light that is reflected by a reflecting mirror 314 to illuminate the image microdisplay 108. The imaged light is then directed through the imaging optic 110 that directs the light into the waveguides 102 and 104. The emitter structure 312 can be implemented with lasers that direct emit the light, and a reflective spatial light modulator can be implemented as the microdisplay using the lasers for illumination.

Figure 4:
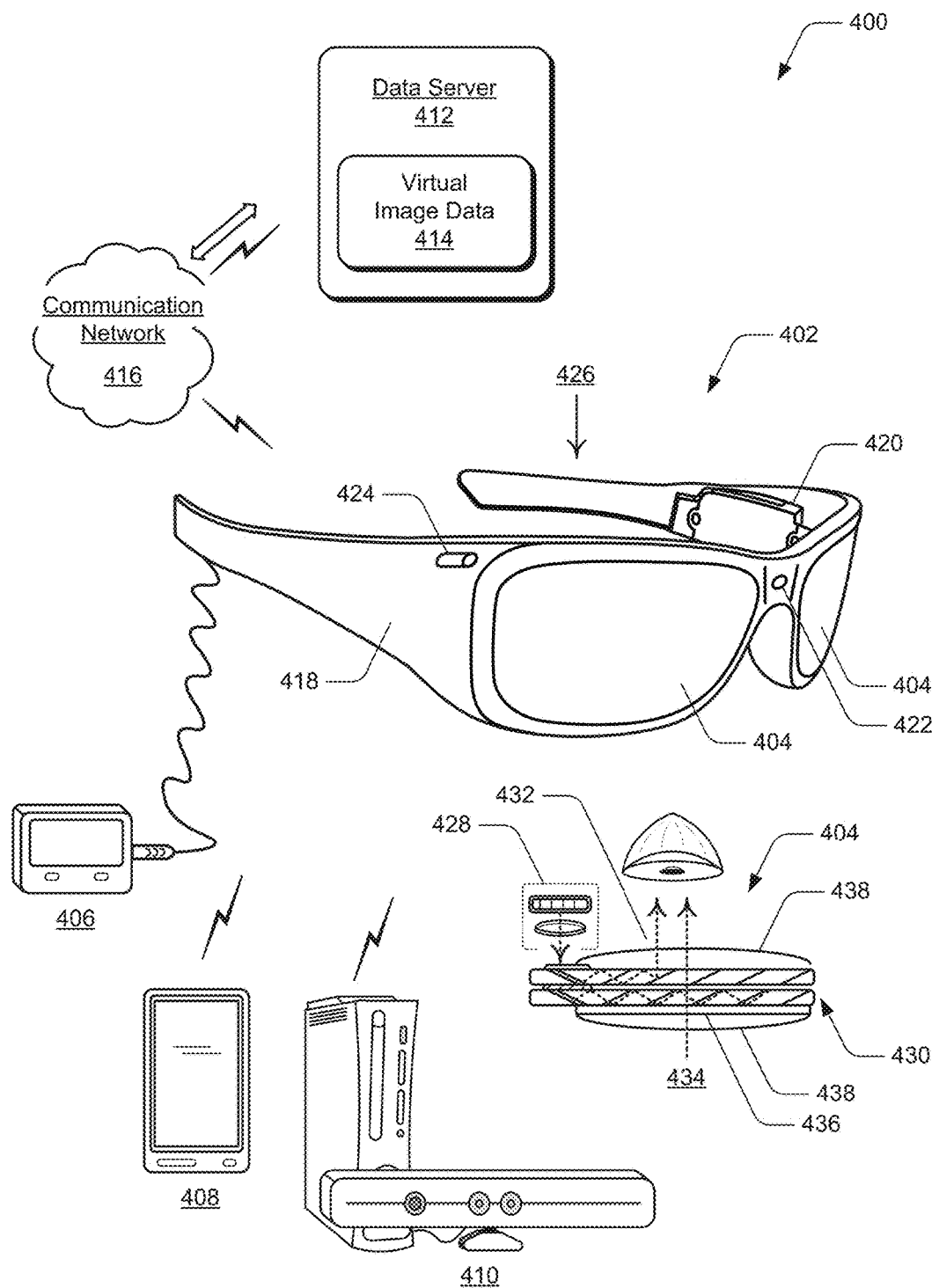
FIG. 4 illustrates an example system that includes an example of a wearable display device in which embodiments of a multiple waveguide imaging structure can be implemented.

FIG. 4 illustrates an example system 400 that includes an example wearable display device 402 in which embodiments of a multiple waveguide imaging structure can be implemented. The wearable display device can be implemented as any type of glasses or head-mounted display (HMD) that includes display lens systems 404 (e.g., left and right display lens systems) through which a user can view the surrounding environment, yet also see virtual images (e.g., any type of object, video, text, graphic, and the like) that are generated for display and appear as a part of the environment.

The wearable display device 402 can be implemented as an independent, portable system that includes memory, software, a processor, and/or a power source. Alternatively or in addition, the wearable display device may be communicatively linked to a controller 406 that includes any one or combination of the memory, software, processor, and/or power source, such as a battery unit. The controller can be implemented for wired or wireless communication with the wearable display device. The controller and/or the wearable display device can also be implemented with any number and combination of differing components as further described with reference to the example device shown in FIG. 6. For example, the controller and/or the wearable display device includes an imaging application implemented as computer-executable instructions, such as a software application, and executed by a processor to implement embodiments of a multiple waveguide imaging structure as described herein.

In embodiments, the controller may be implemented as a dedicated device (e.g., the wired controller 406), as a mobile phone 408, a tablet or other portable computer device, a gaming system 410, or as any other type of electronic device that can be implemented to process and generate virtual images for display as part of the environment that is viewed through the display lens system of the wearable display device. The controller may communicate with the wearable display device wirelessly via WiFi™, Bluetooth™, infrared (IR), RFID transmission, wireless Universal Serial Bus (WUSB), cellular, or via other wireless communication techniques.

The example system 400 also includes a data server 412, or data service, that communicates, or otherwise distributes, virtual image data 414 to the wearable display device 402 via a communication network 416. For example, the data server may be part of a network-based gaming system that generates virtual images for augmented reality display at the wearable display device. Alternatively, the data server may be part of a navigation system that communicates navigation directions and information for display in the display lens systems 404 of the wearable display device. In another example, the data server may be part of a messaging service, such as an e-mail or text messaging system, that communicates e-mail and/or text messages to the wearable display device for display in the display lens systems, where a user can read a message as an augmented reality image that is displayed over the environment viewed through the wearable display device.

Any of the devices, servers, and/or services can communicate via the communication network 416, which may be implemented to include wired and/or wireless networks. The communication network can also be implemented using any type of network topology and/or communication protocol, and can be represented or otherwise implemented as a combination of two or more networks, to include IP-based networks and/or the Internet. The communication network may also include mobile operator networks that are managed by mobile operators, such as a communication service provider, cell-phone provider, and/or Internet service provider.

The wearable display device 402 includes a frame 418, such as in the form of glasses, goggles, or any other structure, that supports and incorporates the various components of the device, as well as serves as a conduit for electrical and other component connections. A components module 420 (or components modules on the left, right, and/or both sides of the device frame) incorporates any of the various components, such as processing and control circuitry, memory, software, a processor, GPS transceiver, and/or power source. The wearable display device may also include a microphone 422 to record audio data from the surrounding environment, as well as ear phones for audio feedback as part of an augmented reality experience.

The wearable display device 402 also includes various cameras 424 that capture video and still images of the surrounding environment. The image and video data can be processed on the device and/or by a controller device (e.g., controller 406), and used to create a mapping field to orient and track a user in the environment space. The wearable display device can also include eye-tracking cameras used to determine a user eyeball and/or pupil location, and to track eye movements. The wearable display device may also include a temperature sensor, as well as inertial sensors and/or attitude sensors, including MEMS gyros, magnetic sensors (e.g., a compass), and acceleration sensors for sensing position, orientation, and acceleration of the wearable display device.

An example of one display lens system 404 is shown from a viewer perspective 426 of the wearable display device 402, as if viewing the display lens system from the top of the device. The display lens system includes an imaging system 428, which can be implemented with any number of micro display panels, lenses, and reflecting elements to display and project a virtual image into a see-through and reflecting waveguide 430. A display lens system 404 can also be implemented as the imaging units described with reference to FIG. 3 that incorporate any of the imaging structures described with reference to FIGS. 1 and 2 to implement embodiments of a multiple waveguide imaging structure. The see-through, reflecting waveguides 430 are is implemented for internal reflection and conducts the visible light 432 of a virtual image that is generated by the imaging unit for viewing by a user, and also passes through the light 434 from the surrounding environment for viewing by the user.

The micro display panels, lenses, and/or reflecting elements of the imaging system 428 can be implemented with various display technologies, such as implemented with a transparent LCD, or using a transmissive projection technology where the light source is modulated by optically active material, backlit with white light. These technologies can be implemented using LCD type displays with powerful backlights and high optical energy densities. Alternatively, a micro display and/or reflecting element can be implemented using a reflective technology, such as digital light processing (DLP) and liquid crystal on silicon (LCOS), that reflects external light, which is reflected and modulated by an optical material.

In embodiments, the imaging system 428 (or other components of a display lens system 404) can be implemented to include an infra-red (IR) laser utilized for system calibrations and/or as an illumination source for an eye-tracking system and camera that tracks the position of a user's eyes and/or pupils. The eye-tracking system includes the eye-tracking illumination source, which is not a visible light, and includes an eye-tracking IR sensor. The IR sensor can be implemented as an IR camera that provides infrared image data of the eye for eye-tracking processing, or an IR sensor that detects eye reflections when the eye is illuminated. Alternatively or in addition, sensors can be implemented in a CMOS driver array to detect the feedback. In implementations, the light reflections (e.g., the IR return) may be directed with SBG or SRB methods. The see-through and reflecting waveguides 430 can also be utilized for the infrared illumination, and for eyeball reflections that the eye-tracking system uses to track the position of the user's eyes and/or pupils.

In this example, the display lens systems 404 include an optional opacity filter 436, and a see-through lens 438 on each side of the waveguides 430. The see-through lenses can be standard eye-glass lenses and made to prescription (or no prescription). The opacity filter selectively blocks natural light, either uniformly or on a per-pixel basis, from passing through the see-through and reflecting waveguide to enhance the contrast of a displayed virtual image.

Example method 500 is described with reference to FIG. 5 in accordance with one or more embodiments of a multiple waveguide imaging structure. Generally, any of the services, functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable storage media devices, both local and/or remote to a computer processor. The methods may also be practiced in a distributed computing environment by multiple computer devices. Further, the features described herein are platform-independent and can be implemented on a variety of computing platforms having a variety of processors.

Figure 5:
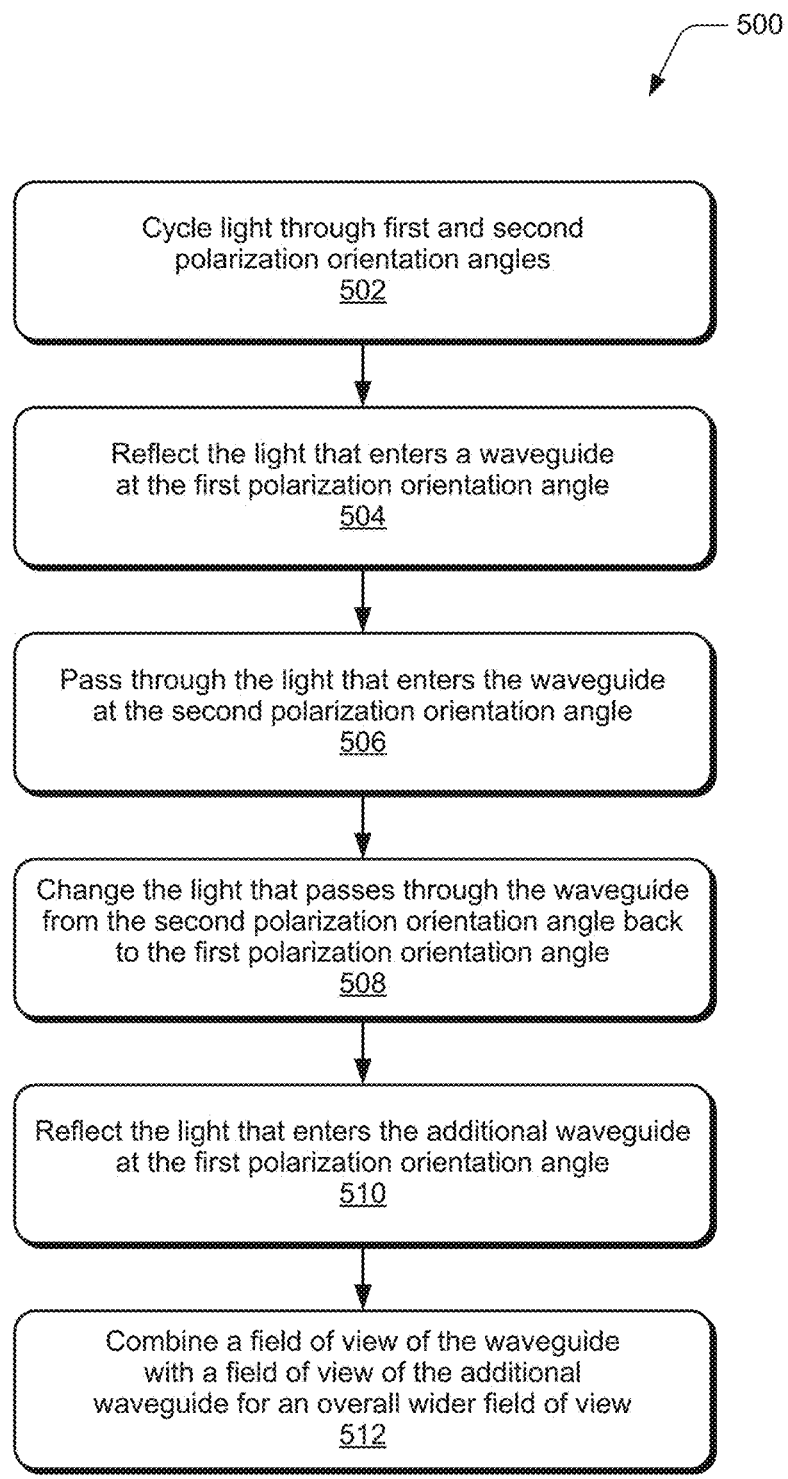
FIG. 5 illustrates example method(s) of a multiple waveguide imaging structure in accordance with one or more embodiments.

FIG. 5 illustrates example method(s) 500 of a multiple waveguide imaging structure. The order in which the method blocks are described are not intended to be construed as a limitation, and any number of the described method blocks can be combined in any order to implement a method, or an alternate method.

At block 502, light is cycled through first and second polarization orientation angles. For example, the polarization switch 114 (FIG. 1) rotates or cycles the light of a virtual image through polarization orientation angles before the light is reflected into the waveguides of the imaging structure 100. The polarization switch rotates the polarization of the light to time-sequentially create the wider field of view based on a combination of the waveguides different fields of view.

At block 504, the light that enters a waveguide at the first polarization orientation angle is reflected in the waveguide. For example, the polarizing beam splitter 116 that is integrated in the waveguide 102 reflects the light of the virtual image that enters the waveguide at the first polarization orientation angle to propagate the light in the waveguide. Similarly, the polarizing beam splitter 120 that is integrated in the waveguide 104 reflects the light of the virtual image that enters the waveguide at the first polarization orientation angle to propagate the light in the waveguide.

At block 506, the light that enters the waveguide at the second polarization orientation angle is passed through the waveguide. For example, the polarizing beam splitter 116 that is integrated in the waveguide 102 passes the light of the virtual image that enters at the second polarization orientation angle through the waveguide to the half waveplate 118 and into the additional waveguide 104 as the polarization switch 114 rotates or cycles the polarization of the light through the first and second polarization orientation angles.

At block 508, the light that passes through the waveguide from the second polarization orientation angle is changed back to the first polarization orientation angle. For example, the half waveplate 118 changes the light of the virtual image (e.g., alters the polarization state of the light) back to the first polarization orientation angle before the light then enters the additional waveguide 104 at the first polarization orientation angle.

At block 510, the light that enters the additional waveguide at the first polarization orientation angle is reflected in the additional waveguide. For example, the polarizing beam splitter 120 in the additional waveguide 104 reflects the light of the virtual image that enters the waveguide at the first polarization orientation angle to propagate the light in the waveguide.

At block 512, a field of view of the waveguide is combined with a field of view of the additional waveguide for an overall wider field of view. For example, the waveguides 102 and 104 are implemented for see-through viewing of an environment, with the waveguide 102 having a first field of view and the additional waveguide 104 having a second, different field of view. The polarization of the light is rotated (e.g., rotated or cycled at block 502) to time-sequentially create the wider field of view from the combined fields of view of the waveguides. In embodiments, additional waveguides with different fields of view can be added to expand the overall field of view of an imaging unit, such as described with reference to FIG. 2. For example, blocks 506-512 can be repeated for additional waveguides.

Figure 6:
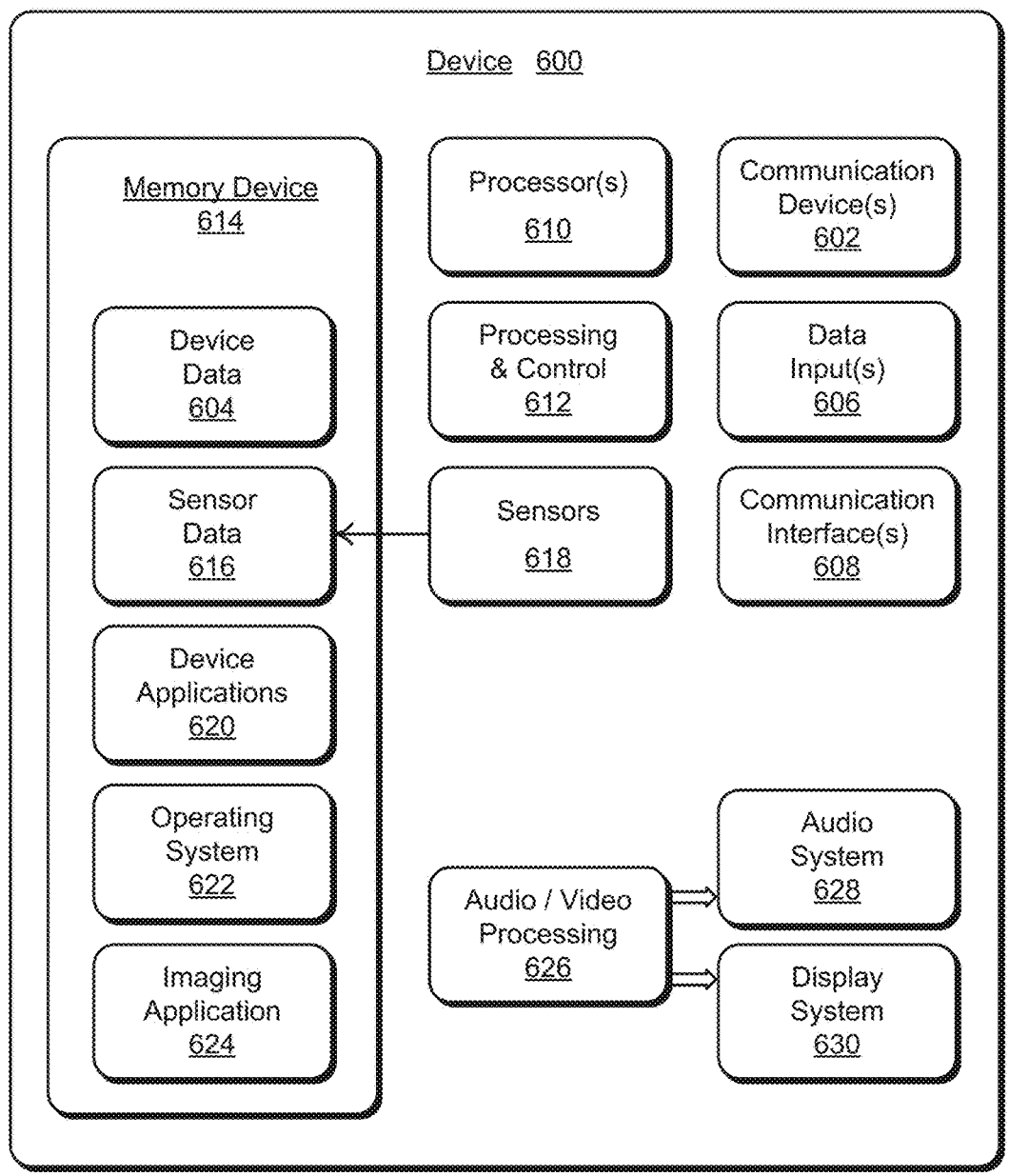
FIG. 6 illustrates various components of an example device that can implement embodiments of a multiple waveguide imaging structure.

FIG. 6 illustrates various components of an example device 600 that can be implemented as any of the devices described with reference to the previous FIGS. 1-5, such as a wearable display device and/or a controller for a wearable display device. In embodiments, the device may be implemented as any one or combination of a fixed or mobile device, in any form of a consumer, computer, portable, communication, phone, navigation, appliance, gaming, media playback, and/or electronic device. The device may also be associated with a user (i.e., a person) and/or an entity that operates the device such that a device describes logical devices that include users, software, firmware, hardware, and/or a combination of devices.

The device 600 includes communication devices 602 that enable wired and/or wireless communication of device data 604, such as virtual image data, as well as video and images data, and other media content stored on the device. The media content stored on the device can include any type of audio, video, and/or image data. The device includes one or more data inputs 606 via which any type of data, media content, and/or inputs can be received, such as user-selectable inputs and any other type of audio, video, and/or image data received from any content and/or data source. The data inputs 606 may include USB ports, coaxial cable, and other serial or parallel connectors (including internal connectors) for flash memory, DVDs, CDs, and the like. The data inputs can be used to couple the device to components, peripherals, and accessories, such as keyboards, microphones, cameras, and any other type of input devices.

The device 600 also includes communication interfaces 608, such as any one or more of a serial, parallel, network, or wireless interface. The communication interfaces provide a connection and/or communication links between the device and a communication network by which other electronic, computing, and communication devices communicate data with the device. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 600 includes one or more processors 610 (e.g., any of microprocessors, controllers, and the like), or a processor and memory system (e.g., implemented in an SoC), which process computer-executable instructions to control the operation of the device. Alternatively or in addition, the device can be implemented with any one or combination of software, hardware, firmware, or fixed logic circuitry that is implemented in connection with processing and control circuits which are generally identified at 612.

The device 600 also includes one or more memory devices 614 (e.g., computer-readable storage media) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device. Computer-readable storage media can be any available medium or media that is accessed by a computing device.

A memory device 614 provides data storage mechanisms to store the device data 604, sensor data 616 from sensors 618 and other data input devices, such as cameras, other types of information and/or data, and device applications 620. For example, an operating system 622 can be maintained as a software application with the memory device and executed on the processors. The device applications may also include a device manager or controller, such as any form of a control application, software application, signal processing and control module, code that is native to a particular device, a hardware abstraction layer for a particular device, and so on. In this example, the device applications also include an imaging application 624 that can implement embodiments of a multiple waveguide imaging structure as described herein.

The device 600 may also include an audio and/or video processing system 626 that generates audio data for an audio system 628 and/or generates display data for a display system 630. The audio system and/or the display system may include any devices that process, display, and/or otherwise render audio, video, display, and/or image data. In implementations, the audio system and/or the display system are external components to the device. Alternatively, the audio system and/or the display system are integrated components of the example device.

Although embodiments of a multiple waveguide imaging structure have been described in language specific to features and/or methods, the appended claims are not necessarily limited to the specific features or methods described. Rather, the specific features and methods are disclosed as example implementations of a multiple waveguide imaging structure.

The invention claimed is:

1. A wearable display device, comprising:
   left and right display lens systems configured for augmented reality imaging;
   left and right imaging units of the respective left and right display lens systems configured to generate an augmented reality image that includes a virtual image;
   each of the left and right imaging units comprising:
   a first waveguide configured for see-through viewing of an environment at a first field of view, the first waveguide including a first polarizing beam splitter configured to reflect light that enters at a first polarization orientation angle and pass through the light that enters at a second polarization orientation angle; and
   at least a second waveguide configured for see-through viewing of the environment at a second field of view, the second waveguide including a second polarizing beam splitter configured to reflect the light that enters at the first polarization orientation angle and pass through the light that enters at the second polarization orientation angle.

2. The wearable display device as recited in claim 1, further comprising a polarization switch configured to rotate the polarization of the light through the first and second polarization orientation angles.

3. The wearable display device as recited in claim 1, further comprising a polarization switch configured to sequence the polarization of the light to create a wider field of view based on the first field of view and the second field of view.

4. The wearable display device as recited in claim 1, wherein:
 the light that enters the first and second waveguides at the first polarization orientation angle is propagated in the respective first and second waveguides; and
 the light that enters the first waveguide at the second polarization orientation angle is passed through the first waveguide and is reflected into the second waveguide.

5. The wearable display device as recited in claim 1, further comprising a half waveplate configured to change the light that passes through the first waveguide from the second polarization orientation angle back to the first polarization orientation angle, and wherein the light enters the second waveguide at the first polarization orientation angle.

6. The wearable display device as recited in claim 1, wherein the first field of view of the first waveguide is combined with the second field of view of the second waveguide for a wider field of view.

7. The wearable display device as recited in claim 1, wherein each of the left and right imaging units are configured to generate the light as the virtual image that appears as part of the environment viewed through the left and right display lens systems.

8. A wearable display device, comprising:
 left and right display lens systems configured for augmented reality imaging;
 left and right imaging units of the respective left and right display lens systems configured to generate an augmented reality image that includes a virtual image;
 each of the left and right imaging units comprising:
  a polarization switch configured to cycle light through first and second polarization orientation angles;
  a polarizing beam splitter configured to reflect the light that enters a first waveguide at the first polarization orientation angle, the first waveguide configured for see-through viewing at a first field of view, the polarizing beam splitter further configured to pass the light that enters the first waveguide at the second polarization orientation angle through to a second waveguide configured for see-through viewing at a second field of view; and
  a half waveplate configured to change the light that passes through the first waveguide from the second polarization orientation angle back to the first polarization orientation angle before the light then enters the second waveguide at the first polarization angle.

9. The wearable display device as recited in claim 8, wherein:
 the first waveguide is configured to propagate the light that enters at the first polarization orientation angle; and
 the second waveguide is configured to propagate the light that is passed through the first waveguide at the second polarization orientation angle.

10. The wearable display device as recited in claim 8, wherein:
 the light that enters the first and second waveguides at the first polarization orientation angle is propagated in the respective first and second waveguides; and
 the light that enters the first waveguide at the second polarization orientation angle is passed through the first waveguide and is reflected into the second waveguide.

11. The wearable display device as recited in claim 8, wherein the first field of view of the first waveguide combines with the second field of view of the second waveguide for a wider field of view.

12. The wearable display device as recited in claim 8, wherein the polarization switch is configured to sequence the polarization of the light to create a wider field of view based on the first field of view and the second field of view.

13. The wearable display device as recited in claim 8, further comprising:
 an additional polarizing beam splitter configured to reflect the light that enters the second waveguide at the first polarization orientation angle, the additional polarizing beam splitter further configured to pass through the light that enters the second waveguide at the second polarization orientation angle.

14. A method to combine fields of view for a wider field of view in a wearable display device, the method comprising:
 generating an augmented reality image that includes a virtual image with left and right imaging units of the wearable display device, each of the left and right imaging units performing:
 cycling light through first and second polarization orientation angles;
 reflecting the light that enters a first waveguide at the first polarization orientation angle, the first waveguide configured for see-through viewing at a first field of view;
 passing the light that enters the first waveguide at the second polarization orientation angle through to a second waveguide configured for see-through viewing at a second field of view; and
 changing the light that passes through the first waveguide from the second polarization orientation angle back to the first polarization orientation angle before the light then enters the second waveguide at the first polarization angle.

15. The method as recited in claim 14, further comprising:
 propagating the light in the first waveguide that enters at the first polarization orientation angle; and
 propagating the light in the second waveguide that is passed through the first waveguide at the second polarization orientation angle.

16. The method as recited in claim 14, further comprising:
 combining the first field of view of the first waveguide with the second field of view of the second waveguide to create the wider field of view in the wearable display device.

17. The method as recited in claim 14, further comprising:
 sequencing the polarization of the light to create the wider field of view in the wearable display device based on the first field of view and the second field of view.

18. The method as recited in claim 14, further comprising:
 propagating the light that enters the first and second waveguides at the first polarization orientation angle in the respective first and second waveguides;
 said passing the light that enters the first waveguide at the second polarization orientation angle through the first waveguide; and
 reflecting the light that is passed through the first waveguide into the second waveguide.

19. The method as recited in claim 14, further comprising:
 reflecting the light that enters the second waveguide at the first polarization orientation angle; and
 passing through the light that enters the second waveguide at the second polarization orientation angle.

20. The method as recited in claim 14, wherein said generating the augmented reality image comprises the virtual image generated to appear as part of an environment viewed through the first and second waveguides of the left and right imaging units of the wearable display device.

\* \* \* \* \*